United States Patent [19]

Tenma et al.

[11] Patent Number: 5,237,498
[45] Date of Patent: Aug. 17, 1993

[54] SYSTEM AND METHOD FOR COMPUTING PROFITS FOR INDIVIDUAL ENTITIES OF AN ENTITY GROUP VIA USE OF MEANS TO RETRIEVE AND PROCESS DATA FOR SPECIFIC ENTITIES

[75] Inventors: Tadashi Tenma, Sagamihara; Kichizo Akashi, Ebina; Tetsuo Kusuzaki, Kawasaki; Mitsuo Sudo, Tokyo; Takayuki Ishii, Matsudo, all of Japan

[73] Assignee: Hitachi, Ltd., Tokyo, Japan

[21] Appl. No.: 784,635

[22] Filed: Oct. 28, 1991

Related U.S. Application Data

[63] Continuation of Ser. No. 376,513, Jul. 7, 1989, abandoned.

[30] Foreign Application Priority Data

Jul. 8, 1988 [JP] Japan .................................. 63-168704

[51] Int. Cl.⁵ .............................................. G06F 15/21
[52] U.S. Cl. ....................................................... 364/406
[58] Field of Search ................................... 364/401, 406

[56] References Cited

PUBLICATIONS

"Expert Systems in Finance Planning", Humpert et al, Expert Systems, May 1988, vol. 5, No. 2, pp. 78–100.
"Works Companion: The Definitive Guide to Microsoft Works" Cobb et al.

Primary Examiner—Gail O. Hayes
Attorney, Agent, or Firm—Fay, Sharpe, Beall, Fagan, Minnich & McKee

[57] ABSTRACT

In a data management system necessary for management such as a profit management of a shop, it is required to collect and to analyze a great amount of various kinds of data items. In such a data management system, in addition to a data base storing therein all data, there are disposed a data base associated with each data utilization purpose and a data base for the data analysis so as to conduct data-base-oriented processing, which enables an analysis result suitable for a purpose to be easily attained and which simplifies the system configuration.

12 Claims, 25 Drawing Sheets

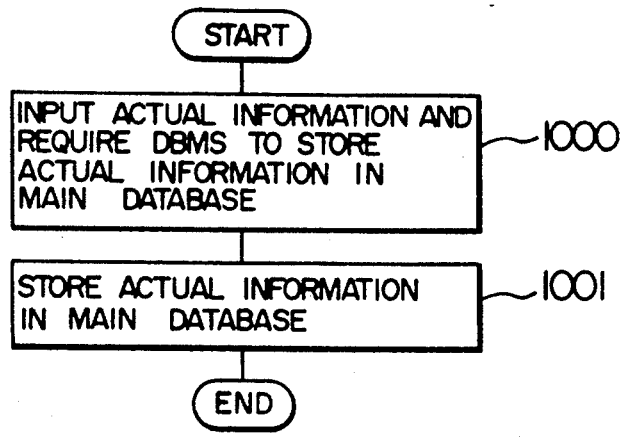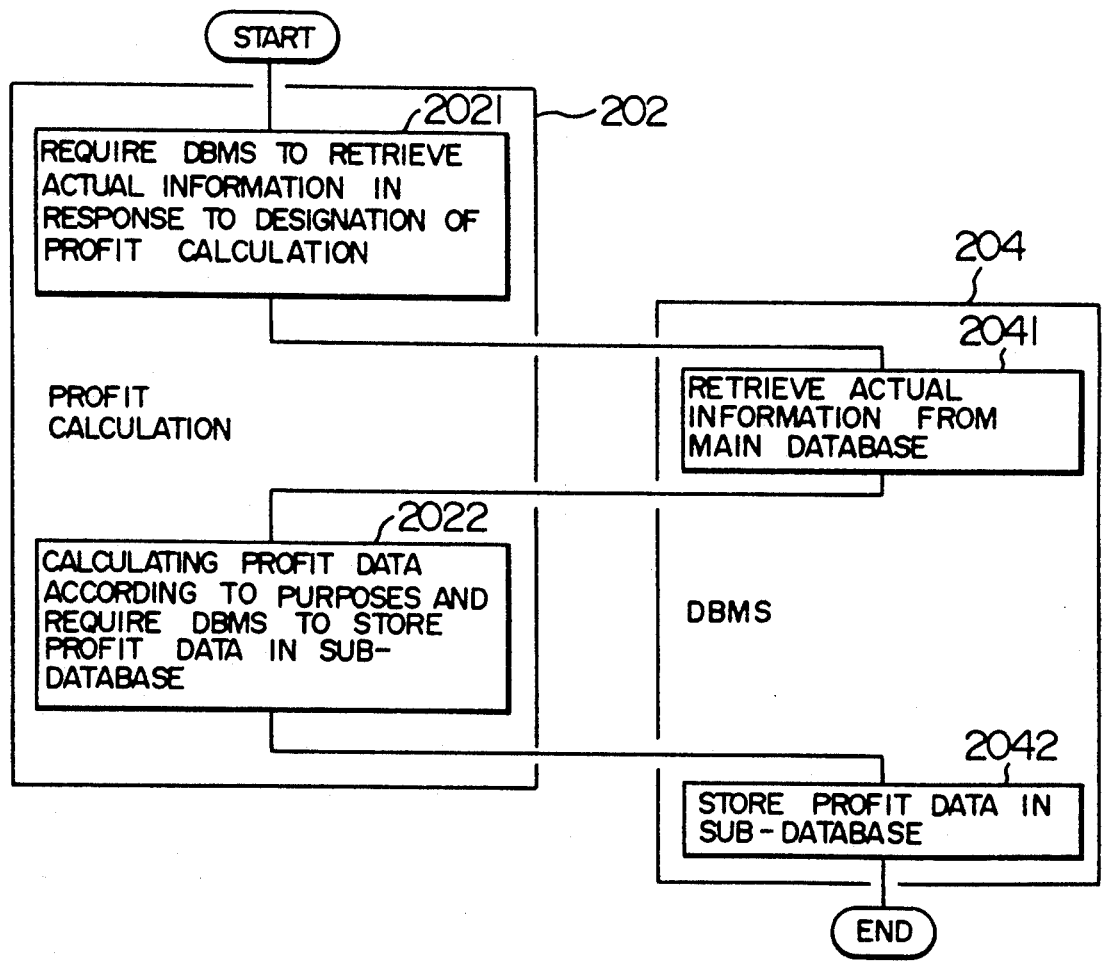

F I G. 6a
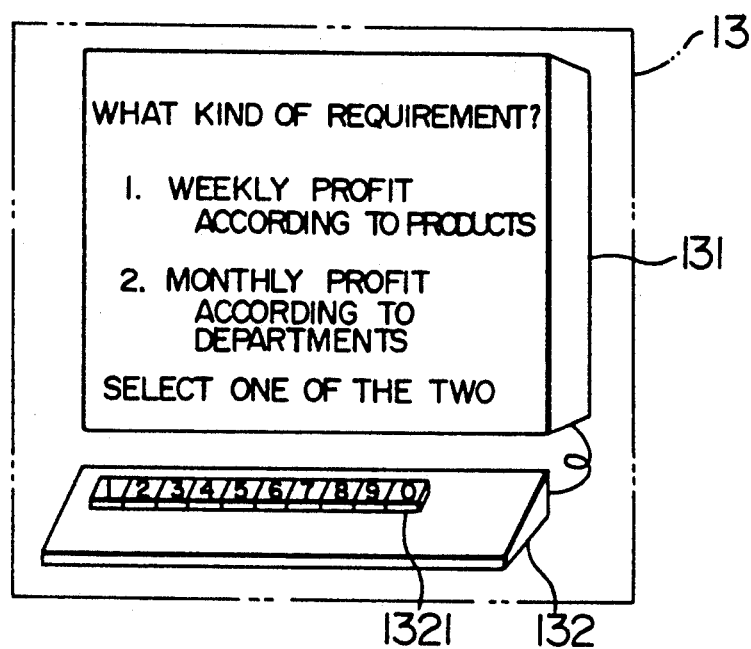
F I G. 6b

FIG. 7

| 4601 YEAR | 4602 MONTH | 4603 WEEK | 4604 PRODUCT NAME | 4605 SHOP NAME | 4606 SALES SECTION NAME | 4607 PRODUCT PROFIT | 4608 SALES AMOUNT | 4609 PURCHACE PRICE | 4610 TRANSPORTATION EXPENSE | 4611 WAREHOUSE EXPENSE | 4612 PROCESSING EXPENSE | 4613 ORDER ISSUANCE AND ACCEPTANCE EXPENSE |
|---|---|---|---|---|---|---|---|---|---|---|---|---|
| 88 | 1 | 1 | g | A | a | 10K¥ | 150K¥ | 80K¥ | 10K¥ | 20K¥ | 30K¥ | 10K¥ |
|  |  |  |  |  |  |  |  |  |  |  |  |  |
|  |  |  |  |  |  |  |  |  |  |  |  |  |

| 4701 YEAR | 4702 MONTH | 4703 WEEK | 4704 PRODUCT NAME | 4705 PRODUCT PROFIT | 4706 TOTAL SALES AMOUNT | 4707 TOTAL PURCHACE PRICE AMOUNT | 4708 TOTAL TRANSPORTATION EXPENSE | 4709 TOTAL WAREHOUSE EXPENSE | 4710 TOTAL PROCESSING EXPENSE | 4711 TOTAL ORDER ISSUANCE AND ACCEPTANCE EXPENSE |
|---|---|---|---|---|---|---|---|---|---|---|
|  |  |  |  |  |  |  |  |  |  |  |
|  |  |  |  |  |  |  |  |  |  |  |
|  |  |  |  |  |  |  |  |  |  |  |

| | 4401 YEAR | 4402 MONTH | 4403 SHOP NAME | 4404 SALES SECTION NAME | 4405 SALES SECTION PROFIT | 4406 SALES AMOUNT | 4407 PURCHACE PRICE | 4408 MERCHANDISING ALLOWANCE | 4409 MANAGEMENT COSTS |
|---|---|---|---|---|---|---|---|---|---|
| 44 | 88 | 1 | A | a | 50 K¥ | 200 K¥ | 130 K¥ | 40 K¥ | 60 K¥ |

FIG. 10

| | 4501 YEAR | 4502 MONTH | 4503 SALES SECTION NAME | 4504 TOTAL SALES SECTION PROFIT | 4505 TOTAL SALES AMOUNT | 4506 TOTAL PURCHACE PRICE | 4507 TOTAL MERCHANDISING ALLOWANCE | 4508 TOTAL MANAGEMENT COSTS |
|---|---|---|---|---|---|---|---|---|
| 45 | 88 | 1 | a | 50 M¥ | 200 M¥ | 130 M¥ | 40 M¥ | 60 M¥ |

FIG. 18a

```
                                  ╱710
┌─────────────────────────────┐
│ WHAT KIND OF RETRIEVAL ?    │
│                             │
│ 1. ACCORDING TO DEPARTMENTS │
│ 2. ACCORDING TO PRODUCTS    │
│                             │
│ SELECT ONE OF THE TWO       │
└─────────────────────────────┘
```

FIG. 18b

```
┌──────────────────────────┐
│ PERIOD ?                 │
│ __/__/__ ~ __/__/__      │
│ RANGE ?                  │
│   1. ALL SHOPS           │
│   2. SPECIFIED SHOP      │
│      NAME OF SHOPS:_____ │
└──────────────────────────┘
                    ╲
                     710
```

FIG. 18c

```
                              ╱710
┌──────────────────────────┐
│ PERIOD ?                 │
│ __/__/__ ~ __/__/__      │
│ RANGE ?                  │
│   NAME OF SALES COUNTER: │
│     _____            │
│   1. ALL SHOPS           │
│   2. SPECIFIED SHOP      │
│      NAME OF SHOP:_____  │
└──────────────────────────┘
```

FIG. 18d

| 7241 RETRIEVAL KIND | 7242 RETRIEVAL RANGE | 7243 SHOP NAME | 7244 SALES SECTION NAME | 7245 RETRIEVAL START DATE | 7246 RETRIEVAL END DATE |
|---|---|---|---|---|---|
|  |  |  |  |  |  |
|  |  |  |  |  |  |

724

F I G. 19a
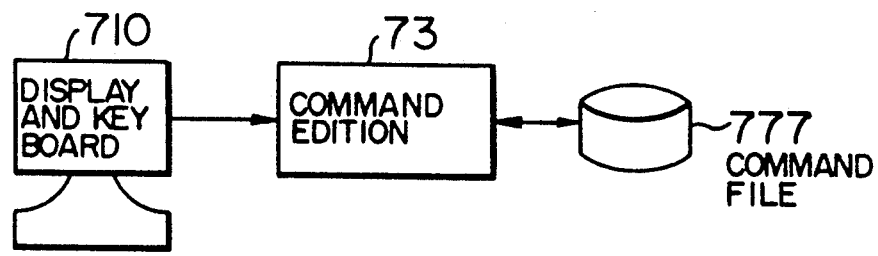
F I G. 19b
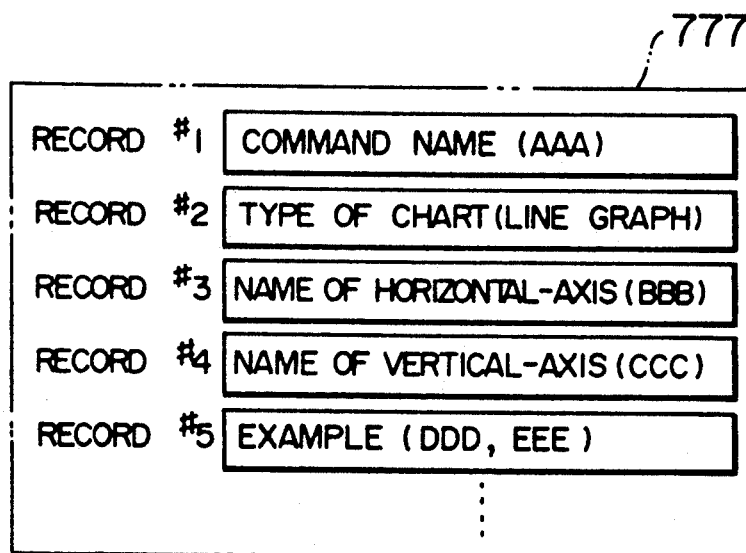

F I G. 20a
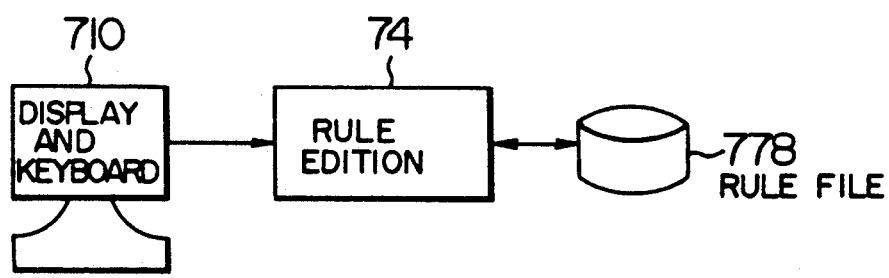
F I G. 20b
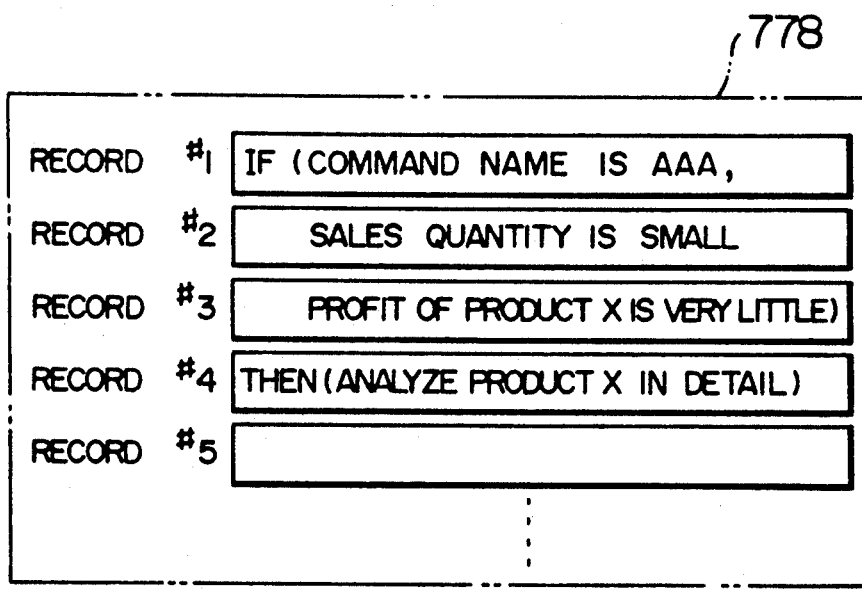

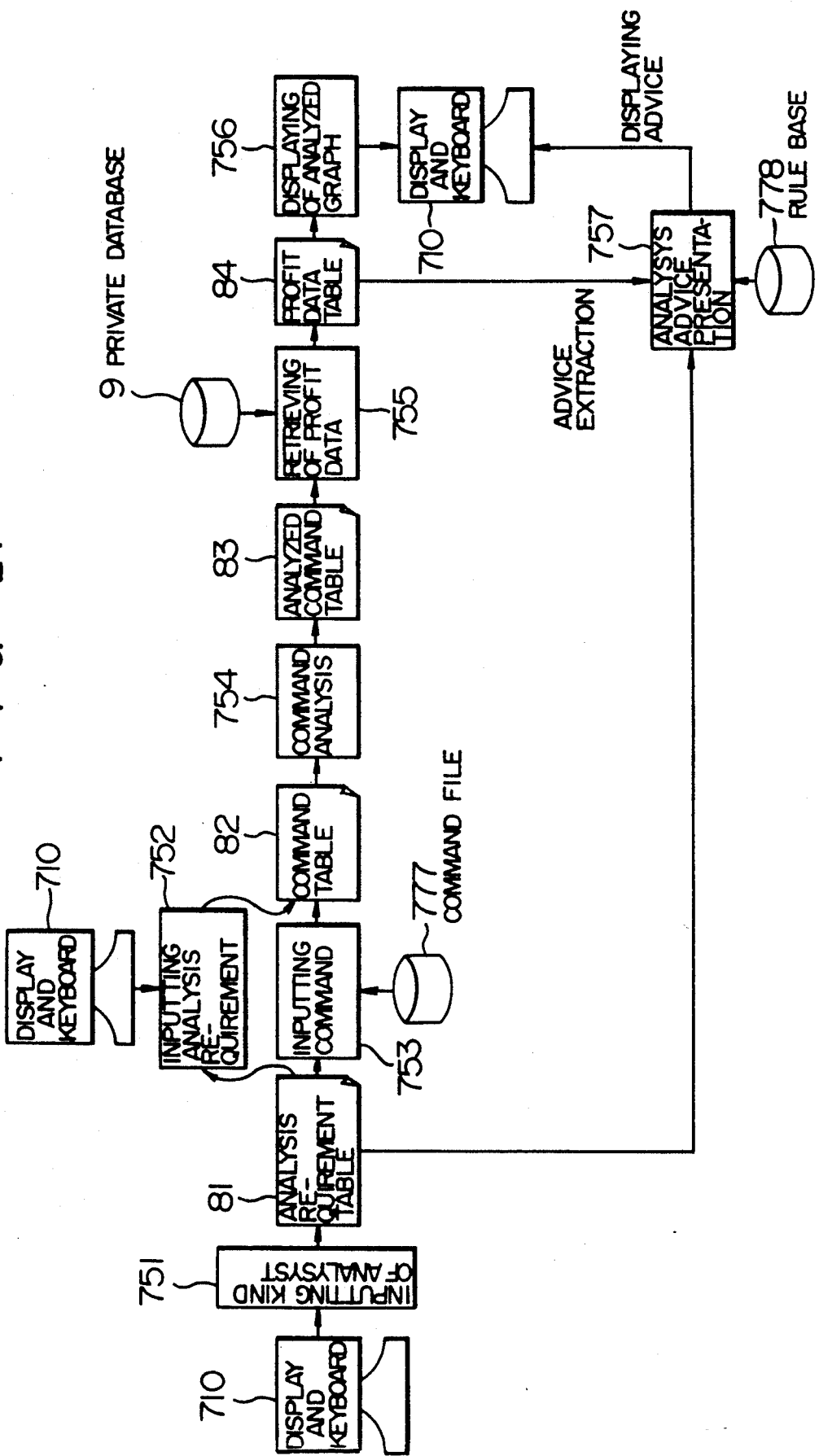

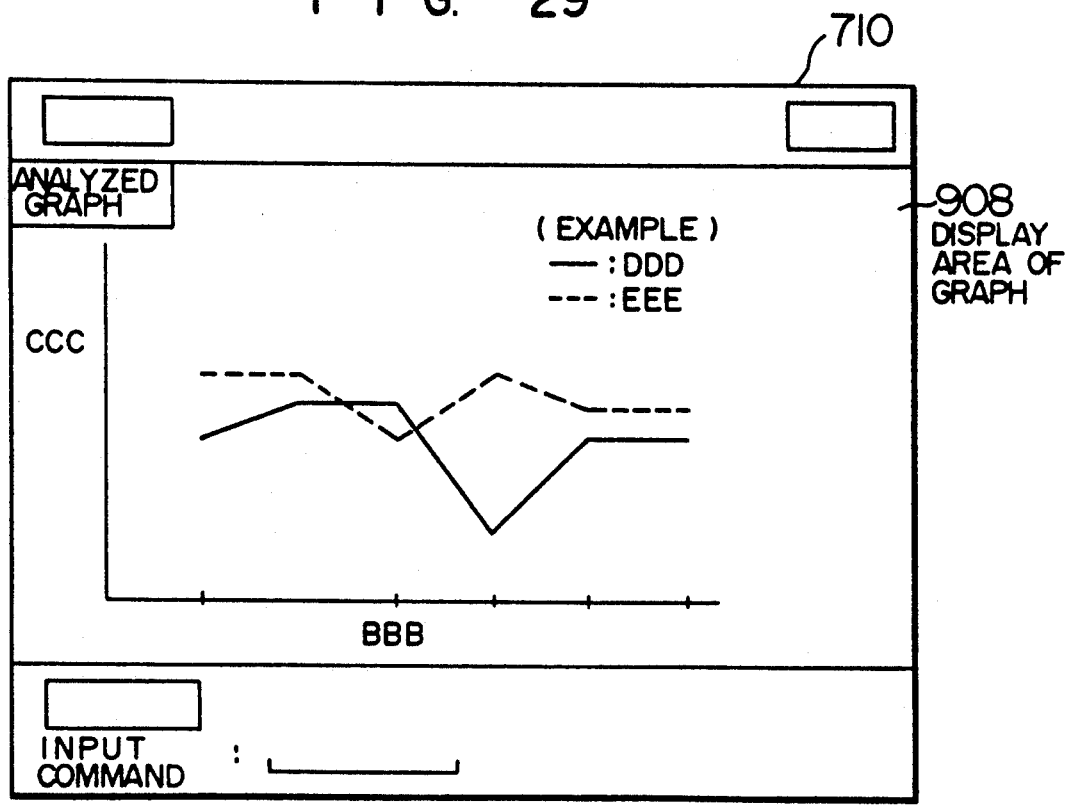

SYSTEM AND METHOD FOR COMPUTING PROFITS FOR INDIVIDUAL ENTITIES OF AN ENTITY GROUP VIA USE OF MEANS TO RETRIEVE AND PROCESS DATA FOR SPECIFIC ENTITIES

This is a continuation of copending U.S. patent application Ser. No. 07/376,513, filed on Jul. 7, 1989, now abandoned.

BACKGROUND OF THE INVENTION

The present application relates to a data management method and system, and in particular, to a data management method and system in which various actual result data items undergo processing and are stored or are accumulated so as to be analyzed. More specifically, the present application is suitable for retail stores such as a supermarket to conduct operations including the calculation, accumulation, or analysis of the profit for stores, sales sections, or products.

In a profit calculation system for computing profits by stores or sales sections, the profit is calculated, for example, in the following method. Depending on a ratio of the number of products or items handled or sold in each sales section, there are distributed common expenses to the respective sales sections such that the profit of each store or section is computed from the distributed common expenses and individual expenses thereof (for details, reference is to be made to JP-A-61-224068).

In addition, for the method of calculating the profit by a product, there has been proposed as a measure to evaluate the profit by a product a concept of a direct product profit (DPP) in an article of Food Marketing Institute: Direct Product Profit Manual (1986), pp. Intro-2, pp. 2-3 to 2-8. In order to attain the direct product profit, a purchase price is subtracted from a sales price at a store and a temporary reduction (rebate) to the dealer is added to the obtained value; thereafter, a direct product cost (DPC) necessary for selling the product is subtracted from the resultant value. In the computation above, there are included any costs directly required to sell a product such as the personal expenditure in the warehouse, the warehouse space charge, the inventory management cost, the cost for the transportation of products to the store, the personal expenditure in the store, the store space charge, and the personal expenditure for the employee to arrange products in a paper bag at a cash register in the store. However, the indirect costs are not included for the calculation of the direct product profit.

SUMMARY OF THE INVENTION

It is therefore an object of the present invention to provide a data management system and a data management method capable of coping with various utilization purposes of data at a high speed.

Another object of the present invention is to provide a data management system and a data management method in which data analysis results associated with utilization purposes can be attained from a great amount of various kinds of data.

Still another object of the present invention is to provide a data management system and a data management method capable of coping with computation and analysis of profits by stores, sales sections, and products in a retail store.

Above and other objects of the present invention will become apparent from the detailed description in conjunction with the accompanying drawings.

Information necessary to plan or to schedule management includes profit data associated with the respective stores, sales sections, and products. In order to link such various profit data to the planning and scheduling of management, there are required three operation phases including operations to calculate profits, to store or to accumulate the profits, and to analyze profits. Description will next be given of the respective phases.

(1) Calculation of profits

With improvement of jobs and with advancement of apparatuses for the store automation (SA), the items to be included in the direct product cost (DPC) undergo a change. Since the life cycle of products is short, the products to be handled are frequently replaced; in consequence, for all stores, all products cannot necessarily match with the conventional computation model.

For the direct product profit (DPP) calculation in the conventional computation model, it is necessary to obtain the direct product cost (DPC) for each product item. Due to the point of sale (POS) system employed in a wide range of fields, the cost of a portion of the direct product cost can be obtained for each item or article. However, for the overall direct product cost, the direct product cost cannot be obtained for each product. The number of products handled in a store or a shop ranges from several tens of thousand to several hundreds of thousand, and hence it is impossible to obtain the direct product cost for each product through manual operations.

Consequently, in order to efficiently employ the conventional computation model, there is used as a key a distribution method in which the cost common to a plurality of products is distributed to the respective products according to appropriate ratios. In some stores, a method according to the conventional concept may be suitable as the cost distribution method. However, a satisfactory distribution cannot be necessarily achieved by use of the conventional method. For example, this applies to a case where the same number of large-sized and small-sized articles are fetched from a back room so as to be added to the existing articles in a showcase. In this case, the number of operations to move the items varies depending on the capacity of a transporting apparatus, and the required work time accordingly changes.

As described above, in the prior technology, considerations were not given to the variety of the computation model and cost distribution, which leads to a problem that the system cannot flexibly cope with individuality of the stores and products and with the growth of the store automation system.

(2) Accumulation of profits

Managers at various hierarchic levels such as the shop manager and the buyers analyze the profit data to use the analysis result for the planning and scheduling of management. The necessary profit data varies depending on the management levels of the managers and the utilization purposes thereof. For example, it is necessary for the store manager to obtain such data for the job of the manager as monthly or quarterly profit data collected in the preceding several years for each sales section. On the other hand, the buyers need daily or weekly profit data for each product.

The profit data for each product is computed depending on the actual results of the daily sales and hence forms a time series data. The number of products ranges from several tens of thousand to several hundreds of thousand, and these products to be handled are frequently replaced; in consequence, a considerably great amount of profit data is collected.

A problem to be solved here is how to materialize a data base capable of supplying the users including the managers at the various levels with the great amount of profit data according to the utilization purposes at a high speed, that is, how to constitute a profit data base having a variety of retrieval operations and response capability.

(3) Analysis of profits

In general, the profit data is presented to the user in a predetermined graphic format. However, such a graphic format is insufficient for the reasons below.

The purpose of the profit analysis varies depending on the utilization purpose of the analysis result, namely, how the analysis result is employed for the planning or scheduling of the management strategy. Depending on the purposes of the profit analysis, the data items to be analyzed and the analysis procedure also change. In addition, even for a specific purpose, since the analysis job is an undeterminable job which cannot be represented with routine work, it is impossible to limit the data items to be analyzed and the analysis procedure.

On the other hand, the analysis job may be represented with routine work as a determinate job, which although applies only to a portion thereof, by repeatedly achieving the analysis job. However, it is difficult to set the patternized or determinate job as a fixed job. Depending on the improvement in the skill of the user and development or expansion of data items due to the advancement of the store automation equipment, it is necessary to partially or completely modify the patternized analysis job.

The analyzers of the profit data range from a beginner, a semi-experienced person, and an experienced worker.

Based on the description above, in a data management system in which a great volume of data is accumulated such that new data is produced therefrom by use of various algorithms so as to analyze the new data, the following point is regarded as a novel problem to be solved.

The new problem is how to realize a data management system and a data management method capable of processing data at a high speed in a case where a great amount of various data items are collected for a broad variety of data utilization purposes. In particular, it is important to constitute a data management system and a data management method to be applied to, for example, the product profit management as the primary usage of the present invention so as:

to establish a profit management system;

to recognize products as good sellers and bad sellers and to appropriately purchase the products; and to constitute information base for planning management strategies.

Description will now be given of a method to achieve the objects above so as to solve the problems according to the present invention.

(1) Calculation of profits

The necessary jobs for the sales of products can be briefly classified into four kinds of jobs as follows, namely, the acceptance and issuance of orders, the stock or warehouse job, the transportation, and the processing job. In consequence, a profit to be attained by selling certain products in a preset period of time can be defined by the following expression.

Profit of a product = Selling price of the product × Number of the products sold
− Purchase price of the product × Number of the products purchased
− Expenses for order acceptance and issuance of the product
− Expenses for warehouse job of the product
− Expenses for transportation of the product
− Expenses for processing job of the product . . . expression (1)

If the respective expenses can be computed, it is possible to easily calculate the profit for the product by the expression (1). Incidentally, if the reduction or rebate is taken into consideration, the element is included as a plus factor in the right side of the expression (1). Algorithms for calculating the costs of the respective jobs vary, as described above, depending on the products, stores, and lapse of time. To cope with this situation, the system is configured such that the computation algorithms of these costs are collected in an algorithm base so as to be separated from the profit calculation algorithms associated with the expression (1).

This provision enables the user, without changing the system configuration, to store "a cost computation algorithm" suitable for the own store in the algorithm base or to modify or to alter the computation algorithm in the algorithm base. As a result, it is possible to constitute a system capable of coping with the individualities and growth of the cost calculation.

(2) Accumulation of profits

If the daily profit data for each product is stored for several years, the problem above cannot be solved due to the great amount of the profit data. As a method of solving this problem, let us consider the data work job and/or data distribution. Description will next be given of a solution for effecting a processing on the data and/or for distributing the data.

As users of the profit data, there may be considered four kinds of managers, namely, the store manager, the buyers, the sales section managers, and the manager of the headquater supervising a plurality of stores. These users evaluate the profit data in the following units depending on the utilization purposes. That is, the profit data is evaluated, for example, for each product, in a macro unit such as the sales section, and in a macro unit of a broader range such as the store. In this situation, let us conduct processing on the profit data so as to produce new data in units associated with the utilization purposes such as for each product, for each sales section, or for each store, thereby accumulating or storing the obtained data.

The profit data is a history of the management conducted in a store, and the resultant profit data is not to be changed in a process of the store management. In consequence, even if the profit data is duplicatedly stored in or is distributed onto a plurality of storage devices, the integrity of the data is not lost. Under this condition, there are constituted data bases for the respective utilization purposes so as to effect a distributed control of the profit data, which enables the variety and response capability of the retrieval processing to be developed.

In addition, there is arranged a data base for the personal analysis for each user (work station) so as to enable a necessary volume of required information to be obtained. With this provision, it can be expected that the variety and response capacity of the retrieval are further improved. The data base provided for each purpose and the data base disposed for the analysis are called a sub-data base and a private data base, respectively herebelow.

(3) Analysis of profits

The problem to be solved for the realization of the profit analysis resides in the following three points as described above.

(a) Variety of graphics including diagrams and graphs of profit data (b) Patterning of graphics and simplifying modification thereof (c) Operability of the system Description will now be given of proposals for solving the problems above.

(a) Variety of graphics including diagrams and graphs of profit data:

As can be seen from the description above, it is difficult to limit an operational condition to one such as "which one of data items is displayed in a graph of which one of graphic types". However, the types of graphics to be employed for the profit data analysis may be limited to some extent. There can be considered the following graphic types, for example.

Broken line graph: Change in the profit, data with respect to time, etc.

Bar chart: Comparison of the profit data between products, etc.

Pie chart (circular graph): Contents of profit data.

Scatter chart: Correlation between profits and sales amounts, etc.

The graphics of the respective types can be defined with the constituent elements as follows.

Broken line graph: Ordinate name, abscissa name, and legend

Bar chart: Ordinate name, abscissa name, and legend

Pie chart (circular graph): Legend

Scatter chart: Ordinate name, abscissa name, and legend

In this situation, the user is enabled to set through an interactive operation a graphic type and a condition "which one of data items is assigned to which one of constituent elements". By use of the means above, the user can select a data item and a graphic type depending on the utilization purpose, thereby implementing the variety of the graphic display.

(b) Patterning of graphics and simplifying modification thereof:

Patterning of graphics means to restrict a combination of a graphic type and data items to be displayed therewith. As a method of achieving this object, there can be considered a method in which for each graph having a fixed pattern, there is prepared a display computer program such that the program is initiated by means of a command or a function key so as to display a graph of the pattern. In this method, however, for each change of a command name, a graph type, or a data item, the program is required to be modified and the modification is not always easily conducted.

In order to facilitate the program modification, it is necessary to enable the user to change a command name, a graph type, and a data item without altering the program. As a method for accomplishing this operation, there may be used a method in which the graphic type and the data items are separated from the program such that the former items are handled as parameters of the program.

More specifically, a command to request a display of a graph having a fixed pattern is constituted with a command name, a graph type, and data items and is then stored in a storage device; whereas a program is produced for each graph type. Under this condition, for a command name supplied from the user, a command associated therewith is retrieved from the storage device. Thereafter, the retrieval result is interpreted and then a program of the pertinent graph type is initiated. Data items to be displayed are transferred as parameters to the program. Through the operation above, without altering the program, it is possible to effect the patterning of the graphs and diagrams, namely, to add a command and to change a graph as well as to delete or to modify a command.

(c) Operability of the system

The analysis of the profit data is carried out in a stepwise manner. The user requests the computer system to present the profit data at the respective stages to analyze the result.

A novice computer system operator is typically not familiar with the operation of the keyboard. Furthermore, the beginner is usually not versed in the formats associated with the respective instructions. As a consequence, for such operators, an instruction format is displayed to fill in conditions for program execution. In a case where the standard values or default values are prepared, such values are displayed. When there exists branches to be selected, it is effective to employ a method (format fill-in method) of selecting an appropriate item by means of a pointing device such as a mouse. For an expert, a method (command operation method) in which an instruction is directly inputted from the keyboard is efficient because the operation time is minimized. For a semi-experienced user, it is essential that these operation methods can be selectively used at the respective analysis stages depending on the degree of experience.

As can be seen from the description above, a system is configured in which the format fill-in method and the command operation method are provided such that either one of the methods is selected by the user at the respective analysis stages.

The satisfactory operability of the system is implemented as described above. Incidentally, there exists the following condition with respect to the system operability.

The system users include experts of the profit analysis and semi-experienced profit analyzers alike. It is efficient to represent an appropriate advice to such semi-experienced profit analyzers at the respective stages of the profit analysis for the improvement of the system operability and for the implementation of a uniform analysis accuracy.

The advice to be supplied includes knowledge collected by the experts and experienced workers through a long experience and is likely to undergo an addition and a change as an updating. For the utilization of the knowledge, it is effective to employ an idea of a knowledge base. For this purpose, the knowledge of the experts associated with the profit analysis is stored in a form of a knowledge base so as to be presented to the user at the respective analysis stages in response to a request from the user.

The object above can be achieved by realized the ideas described above. More specifically, the following constituent elements are used for achieving the object.

(1) Actual result information data base (main data base (DB)): Contains various kinds of actual result information items or actual information items necessary to calculate or compute profits.

(2) Expense calculate algorithm base: Stores a group of algorithms for calculating expenses.

(3) Profit calculate processing (data conversion processing): Controls initiation of expense calculate algorithms and calculates profits depending on utilization purposes.

(4) Sub-data base: Stores and controls profit data distributed for each utilization purpose.

(5) Private data base: Personal data for profit analysis.

(6) Profit analysis processing (data analysis processing): Effects acceptance of analysis requests in format fill-in method and in the command operation method, displays profit data, and represents analysis advice. (7) Command file: Stores and controls the command registered by the user.

(8) Knowledge data base: Stores and controls knowledge concerning analysis advice.

The various kinds of actual information items gathered in a store information system centered on a point of sale (POS) system are stored or are accumulated in the main data base.

The profit calculate processing (data conversion processing) computes expenses necessary to calculate the profit by use of expense calculate algorithms stored in the expense calculate algorithm base. By use of the results of the profit calculation, there is computed the profit for each purpose. The obtained calculation results are distributed to the sub-data bases for storage.

The profit analysis processing (data analysis processing) conducts operations as follows. Prior to the initiation of the profit analysis achieved by the user, the processing receives from the user profit data items and the amount thereof necessary for the profit analysis. Data associated with the contents thus received are read from the sub-data bases so as to be transferred to the private data base. Thereafter, the profit analysis processing receives from the user an analysis request in the format fill-in method or in the command operation method. For an analysis request issued in the command operation method, a command related to the received command name is retrieved from the display request command file. The received request is then interpreted so as to display the pertinent profit data. If the user requests presentation of expert advice, an analysis advice is produced by use of the knowledge stored in the knowledge base so as to be presented to the user.

BRIEF DESCRIPTION OF THE DRAWINGS

These and other objects and advantages of the present invention will become apparent by reference to the following description and accompanying drawings wherein:

FIGS. 3a to 3c are flowcharts showing operations of the embodiment of FIG. 2;

FIGS. 6a, 15a, 18a to 18c, 23, 25, 29, and 30 are schematic diagrams respectively showing screens on a display device;

FIGS. 6b, 7, 8, 9, 10, 11, 12, 15b, 18d, 24, 26, 27, and 28 are diagrams respectively showing configurations of tables;

FIG. 19a a functional configuration diagram showing the command edit processing in the embodiment according to the present invention;

FIG. 19b is a schematic diagram showing the contents of the command file;

FIG. 20a is a functional configuration diagram showing the rule edit processing in the embodiment according to the present invention;

FIG. 20b is a schematic diagram showing the contents of the rule file;

FIG. 21 is a functional configuration diagram showing the profit data analysis processing in the embodiment according to the present invention.

DESCRIPTION OF THE PREFERRED EMBODIMENTS

Figure 1:
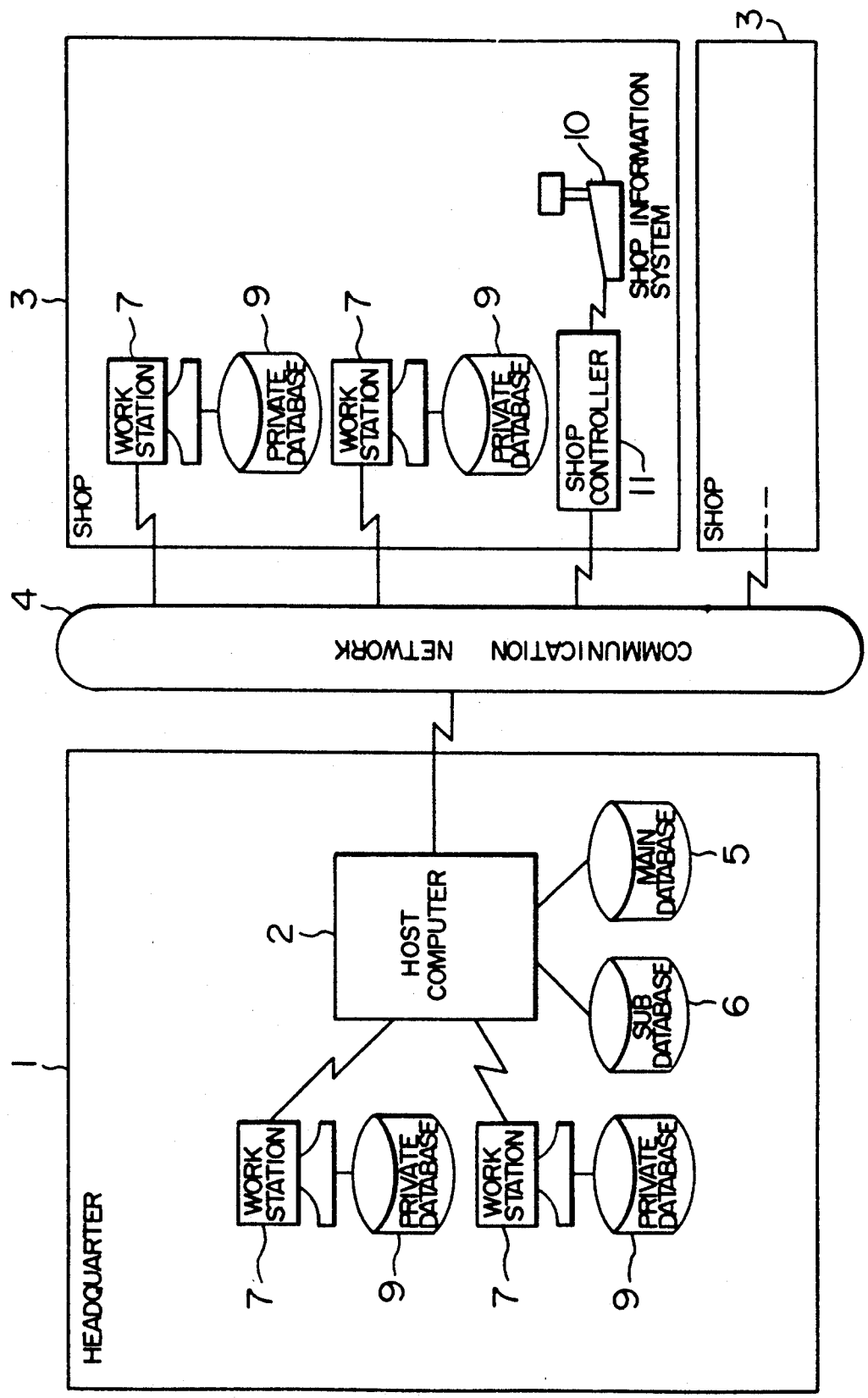
FIGS. 1 and 2 are configuration diagrams respectively showing embodiments of a data management system according to the present invention.

Referring now to the drawings, description will be given in detail of an embodiment of a data management system according to the present invention. In this embodiment, the present invention is applied to a profit data management method and a system of the same in a store or a shop.

In the description, in order to avoid confusion or misunderstanding of a verb "store", a word "shop" is used for a store or a shop. In consequence, there may appear a case where the term is employed in an unusual manner.

FIG. 1 shows a configuration of an embodiment of the data management system according to the present invention. In this configuration, a host computer 2 is installed in a headquarter 1 supervising and controlling a plurality of shops. The host computer 2 is provided with a main data base 5 in which various kinds of actual information items are accumulated or are stored in order to ultimately undergo data management. The actual information items here include such items as the sales amount and sales quantity for each store and for each product. In addition, there is disposed a sub-data base 6 in which profit data calculated by use of the actual information items stored in the main data base 5 is accumulated so as to be managed for each utilization purpose. In the system, there are further included as many work stations 7 for analyzing the profit data as there are managers at the respective hierarchic levels such as the headquarter manager and headquarter buyers working in the headquarter 1 and the store manager and sales section managers in a shop 3. Each work station 7 is provided with a private data base 9, which is a file for the profit analysis. Information communications between the host computer 2 and the work stations 7 installed in the respective shops 3 are carried out via a communication network 4. Various actual information items gathered by a shop information system 10 centered on the point of sale (POS) system in each shop 3 are temporarily stored in a shop controller 11. The actual information items are sent via the communication network 4 to the host computer 2 of the headquarter 1 so as to be stored in the main data base 5 connected to the host computer 2.

Figure 2:
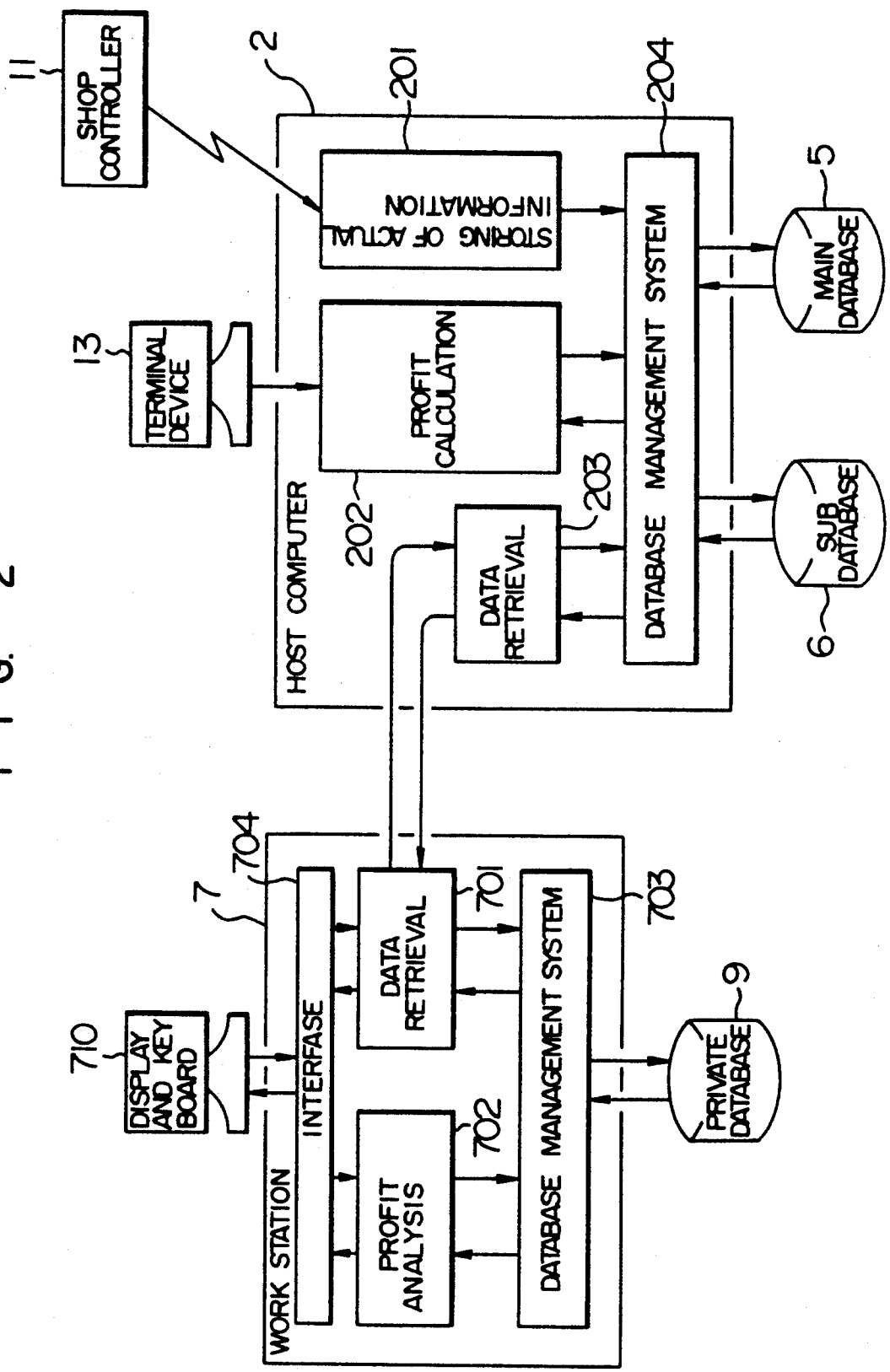

FIG. 2 shows a functional configuration employed to manage the profit data of each shop in the embodiment of FIG. 1. The configuration includes a computer terminal device 13 for the system manager to input data such as an indication of a profit calculation. The host computer 2 achieves (a) processing to store respective actual information items sent from the shop controllers 11 into the main data base 5 (actual information store processing 201), (b) processing to calculate profits for the respective purposes based on the actual information items (profit calculate processing 202), (c) processing to retrieve, in response to a request from a manager at a hierarchic level, profit data from the sub-data base 6 and then to send the profit data to a work station 7 (profit data retrieval processing 203), and (d) processing to manage data bases such as to store information in and to retrieve information from the main data base 5 and the sub-data base 6 (host data base management system (DBMS) 204). The work station 7 conducts data retrieval processing 701, which issues a request, in response to a request from a user (a manager at a hierarchic level to be referred to as a user herebelow), to the profit data retrieval processing 203 to transfer profit data. The transferred profit data is stored in the private data base 9. In addition, the data retrieval processing 701 retrieves profit data from the private data base 9 according to a request from the user. Furthermore, the work station 7 is provided with a process to analyze a request from the user and the profit data so as to display the analysis result via an interface 704 on a display screen 710 of the work station 7 (profit analysis processing 702) and data base management to store information in and to retrieve information from the private data base 9 (workstation data base management system 703).

Referring now to FIGS. 1 and 2, a description will be given of the operation of the overall system.

The various kinds of actual information items inputted from the group information system 10 installed in each shop 3 are passed through the shop controller 11 and the communication network 4 so as to be stored in the main data base 5 connected to the host computer 2. It is possible that a plurality of shop controllers 11 are installed in single shop. Furthermore, a plurality of shop information systems 10 may be linked to a shop controller 11.

By executing the profit calculate processing 202, profit information items grouped for the respective purposes are attained from the actual information items stored in the main data base 5 and are then loaded in the sub-data base 6. The profit calculate processing 202 executes the operation thereof in response to an initiation caused by a command input effected from the terminal device 13 or in response to an automatic initiation associated with a timer ordinarily disposed in the host computer 2.

The reason why the profit calculate processing 202 is executed on the host computer 2 is outlined below. First, when the processing such as the profit calculation to handle a great amount of data is distributed to the respective work stations 7, a heavy load is imposed on each work station 7; in consequence, in order to avoid the heavy load, the profit calculate processing 202 is executed on the host computer 2. Second, the operation above is effected to reduce the amount of information to be communicated between the host computer 2 and the work stations 7. When compared with the volume of actual information stored in the main data base 5, the amount of profit data classified for each purpose or object is greatly reduced. The problem of the amount of information to be communicated is particularly critical when the communication network 4 is employed for the communication. In consequence, as shown in FIG. 2, it is favorable to configure the system such that the profit calculation is executed on the host computer 2.

Naturally, in some cases, for example, in a small-sized system processing a small amount of actual information or in a system in which the headquarter 1 and the store 3 are located in a building, the profit calculation may be desirably conducted in the work station 7.

The work station 7 retrieves desired profit data from the contents of the sub data base 6 connected to the host computer 2 and then stores the profit data in the private data base 9. The data retrieval processing 203 in the host computer 2 initiates the data base management system 204 in response to a request from the data retrieval processing 701 in the work station 7 so as to achieve a retrieval operation on the sub-data base 6. The data retrieval processing 701 in the work station 7 is executed depending on a command input from the keyboard 710 or in response to an automatic initiation associated with a timer ordinarily disposed in the work station 7.

The profit data for the respective purposes stored in the private data base 9 is analyzed by the profit analysis processing 702 and the analysis result is stored in the private data base 9.

The profit analysis processing 702 is also executed depending on a command input or in response to an automatic initiation. The initiation on a command input and that caused by an automatic initiation are selectively employed as follows. The profit analysis processing 702 is executed in response to the automatic initiation and then the analysis result is stored in the private data base 9. The result is outputted to other devices when necessary. As a form of the output, after the analysis result is displayed on the screen 710, a buzzer disposed on the work station 7 is sounded. In another output form, although not shown in the drawings, the analysis result is printed out by means of a printer connected to the work station 7. In the case of the automatic initiation, there is selected a man-machine relationship suitable for a situation where the position of the user is apart from the work station 7. On the other hand, the initiation associated with the command input is employed, for example, in a case where an analysis other than the usual analysis is required.

A description will next be given here of information items to be stored in the respective data bases. The main data base 5 is used to store therein information primarily including the actual information based on the sales at the respective shops. In the sub-data base 6, there are stored profit data for each utilization purpose based on the actual information to facilitate the user to handle the profit data. The private data base 9 is disposed to store information mainly comprising the profit data necessary for the user and analysis results thereof.

As described above, the user of each work station 7 can obtain data matching the utilization purpose at a high speed. The utilization purpose, for example, of a retail store is to attain information related to profits for each shop, each sales section, or each product item.

In consequence, the present invention is also applicable to a system in which a great volume of data is analyzed, for example, a stock exchange information system, a financial information system, or any investigation and analysis system such as a public-opinion analysis system.

Next, description will be given in detail of the present embodiment.

Figure 3C:
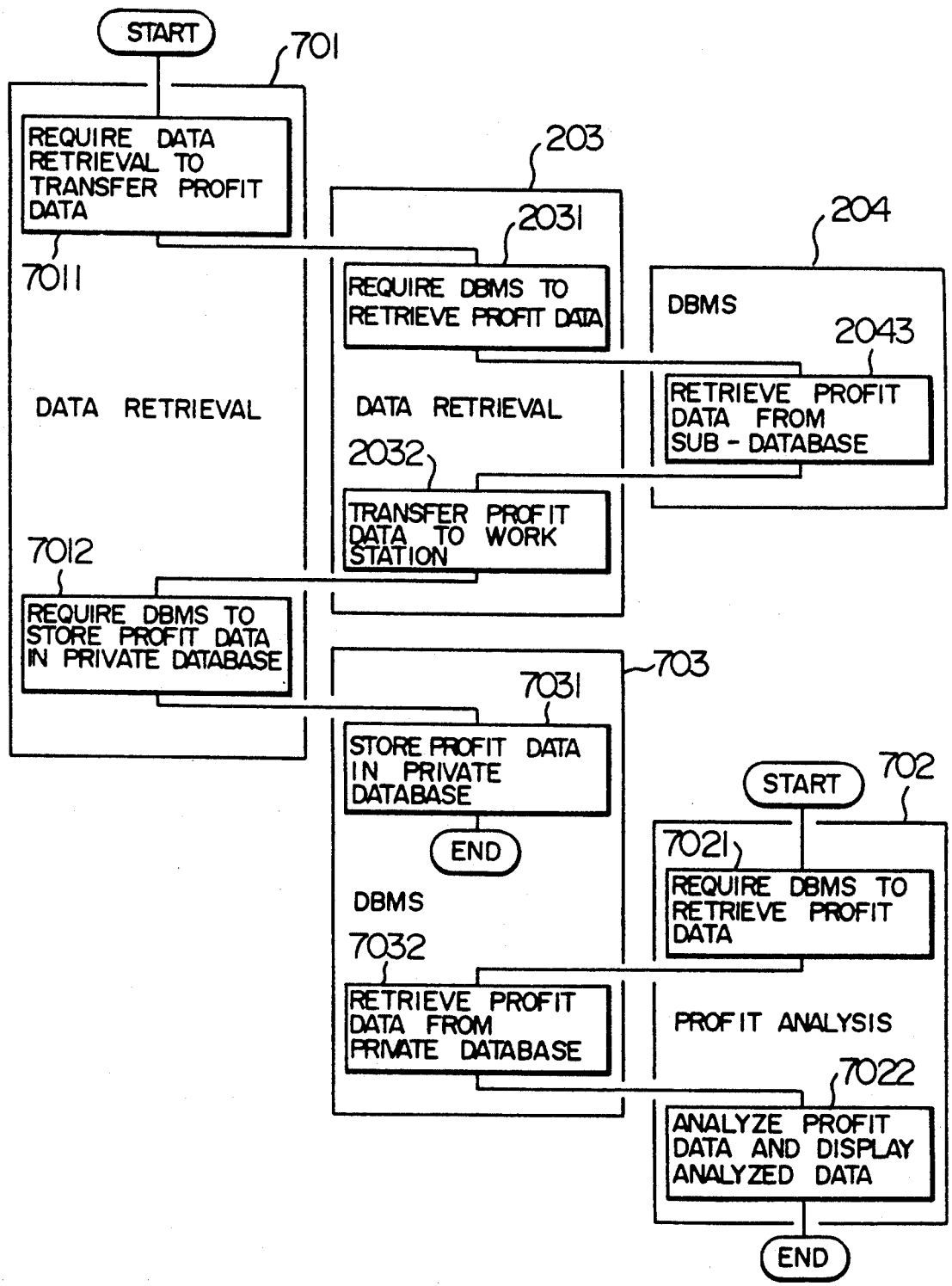

FIGS. 3a to 3e show operation flows of the embodiment of FIG. 2. Between the shop controller 11 and the host computer 2, the operation of FIG. 3a is conducted daily.

Step 1000: This step is executed as a portion of the actual information store processing 201, which receives various actual information items transferred from the shop controllers 11. The host data base management system 204 is initiated so as to store the received actual information in the main data base 5.

Step 1001: This step is executed as a portion the of processing of the host data base management system 204. The actual information received in the step 1000 is stored in the main data base 5.

The host computer 2 executes the processing of FIG. 3b as a weekly job, a monthly job, or when necessary. The following steps 2021 and 2022 are executed as portions of the profit calculate processing 202, whereas the steps 2041 and 2042 are executed as portions of processing of the host data base management system 204.

Step 2021: This step is executed to input a profit calculation instruction from the computer terminal device 13. The host data base management system 204 is initiated so as to retrieve actual information necessary to calculate expenses.

Step 2041: This step retrieves the actual information from the main data base 5.

Step 2022: This step calculates the profit for each purpose based on the retrieved actual information. The host data base management system 204 is initiated so as to store the profit data.

Step 2042: This step stores the profit data in the sub-data base 6.

The work station 7 executes the processing of FIG. 3c. This processing is accomplished by a concatenation of the data retrieval processing 701, the profit analysis processing 702, the data base management system 703 in the work station 7, the data retrieval processing 203, and the data base management system 204 in the host computer 2.

Step 7011: This step requests the profit information retrieval processing 203 to transfer profit data.

Step 2031: This step initiates the host data base management system 204 to retrieve profit data.

Step 2043: This step retrieves profit data from the sub-data base 6.

Step 2032: This step transfers the retrieved profit data to the data retrieval processing 701 of the work station 7.

Step 7012: This step initiates the workstation data base management system 703 to store the transferred profit data.

Step 7031: This step stores the profit data in the private data base 9.

Through the steps above, the profit data necessary for the work station 7 is transferred from the sub-data base 6 to the private data base 9. A description will next be given of a procedure used to analyze the transferred profit data.

Step 7021: This step requests the workstation data base management system 703 to retrieve profit data.

Step 7032: This step retrieves profit data from the private data base 9.

Step 7022: This step analyzes the retrieved profit data and displays the analysis result in a graphic format on the display screen 710.

Although FIGS. 3a to 3c show the respective steps for the associated functions, the structure of the processing programs may be grouped in the functional units or in the units according to the sequence of processing.

Referring now to the drawings, a description will be given in detail of the profit calculate processing 202, the profit analysis processing 702, and the sub-data base 6.

By use of a specific example of the profit calculation, a data conversion method will be described in detail with reference to the drawings.

Figure 4:
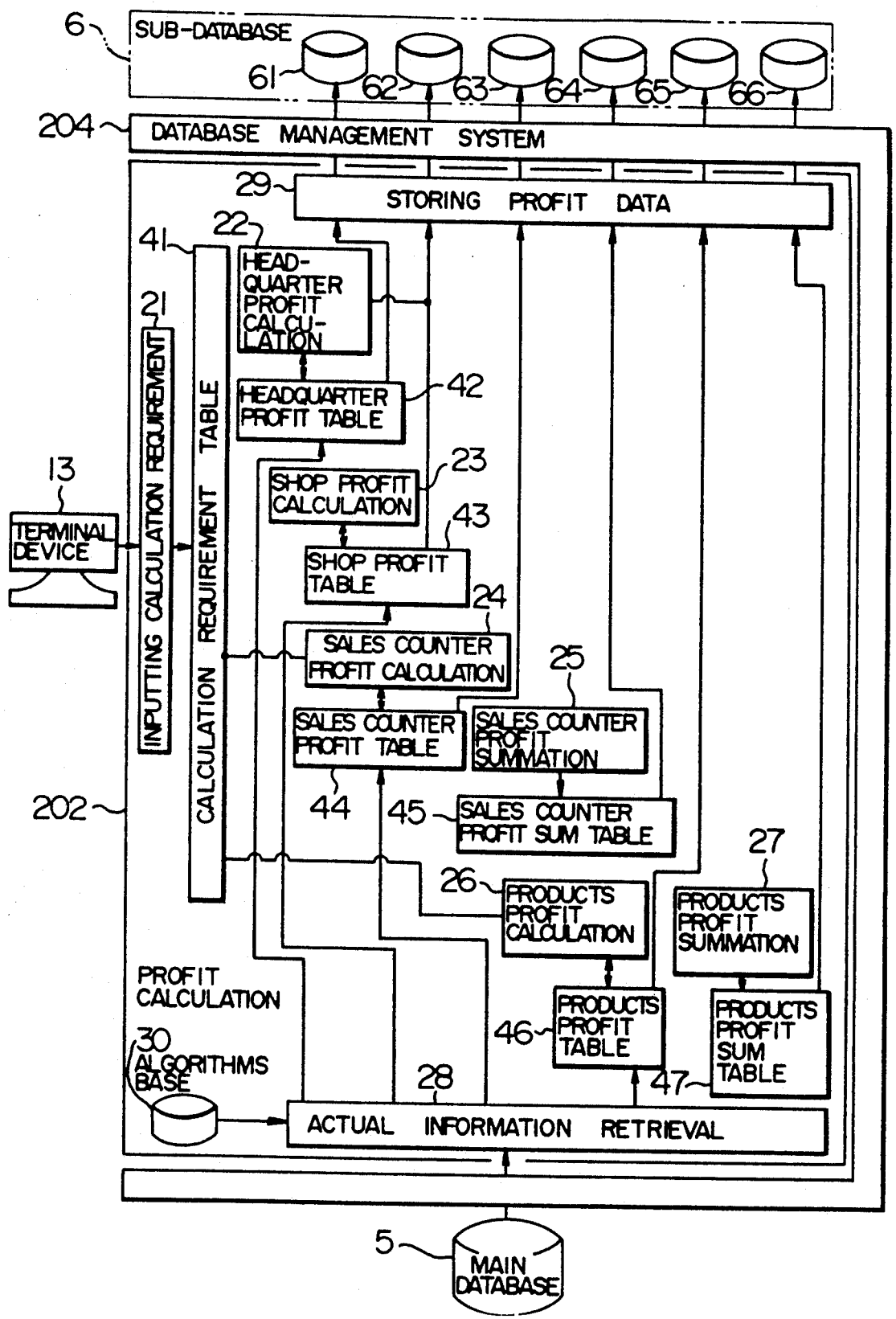
FIG. 4 is a configuration diagram showing the profit calculate processing in the embodiments according to the present invention.

FIG. 4 shows a functional configuration of the profit calculate processing 202. It is assumed here that six kinds of profits are to be calculated as follows.

(1) Weekly profit of each product for each sales section of each store (unit product profit)

$$P_{s,d,g,w} = C^{(a)}_{s,d,g,w} - C^{(b)}_{s,d,g,w} - (E^{(m)}_{s,d,g,w} + E^{(c)}_{s,d,g,w} + E^{(p)}_{s,d,g,w} + E^{(\theta)}_{s,d,g,w}) \quad (2)$$

where, $P_{s,d,g,w}$: Profit of product g in w-th week at sales section d of shop s.

$C^{(a)}_{s,d,g,w}$: Sales amount of product g in w-th week at sales section d of shop s.

$C^{(b)}_{s,d,g,w}$: Purchase amount of product g in w-th week at sales section d of shop s.

$E^{(m)}_{s,d,g,w}$: Transportation expense of product g in w-th week at sales section d of shop s.

$E^{(c)}_{s,d,g,w}$: Warehouse expense of product g in w-th week at sales section d of shop s.

$E^{(p)}_{s,d,g,w}$: Processing expense of product g in w-th week at sales section d of shop s.

$E^{(\theta)}_{s,d,g,w}$: Order issuance and acceptance expense of product g in w-th week at sales section d of shop s.

(2) Monthly profit of each sales section of each shop (sales section profit)

$$P_{s,d} = \sum^{g} \sum^{w} C^{(a)}_{s,d,g,w} - \sum^{g} \sum^{w} C^{(b)}_{s,d,g,w} + R_{s,d} - E_{s,d} \quad (3)$$

where, $P_{s,d}$: Monthly profit of sales section d of shop s.

$R_{s,d}$: Monthly rebate from supplier to sales section d of shop s.

$E_{s,d}$: Monthly operation expense (total of personal expenditure, centralized control expenditure, etc.) of sales section d of shop s.

(3) Monthly profit of each shop (shop profit)

$$P_s = \sum^{d} \sum^{g} \sum^{w} C^{(a)}_{s,d,g,w} - \sum^{d} \sum^{g} \sum^{w} C^{(b)}_{s,d,g,w} + \sum^{d} R_{s,d} - E_s \quad (4)$$

where, $P_s$: Monthly profit of shop s.

$E_s$: Monthly operation expenditure of shop s.

(4) Monthly profit of overall company (headquarter profit)

$$P_h = \overset{s}{\Sigma} P_s - E_h \qquad (5)$$

where, $P_h$: Monthly profit of overall company.

$E_h$: Monthly operation expenditure of headquarter.

(5) Total of profits of a particular product in respective shops (total products profit).

$$P_{g,w} = \overset{s}{\Sigma}\overset{d}{\Sigma} P_{s,d,g,w} \qquad (6)$$

(6) Total of profits of a particular sales section of respective shops (total sales section profit)

$$P_d = \overset{s}{\Sigma} P_{s,d} \qquad (7)$$

The headquarter profit calculate processing 22 computes the headquarter profit from the expression 5. The shop profit calculate processing 23, the sales section profit calculate processing 24, the sales section profit summation processing 25, the product profit calculation processing 26, and the product profit summation processing 27 also calculates the associated profits by use of the expressions 2 to 4, 6, or 7. The actual information retrieval processing 28 retrieves, from the main data base 5, data to be used to effect the operations of the expressions 2 to 7 according to the expense calculate algorithms stored in the algorithm base 30 and then calculates the respective profit data items based on the expressions 2 to 7. The profit data store processing 29 stores the profit data obtained by the processing groups 22 to 27 in the sub-data base 6. The profit calculation request input processing 21 inputs from the computer terminal device 13 a profit calculation requirement or request such as "calculate weekly profit of each product" or "calculate monthly profit of each organization".

Figure 5:
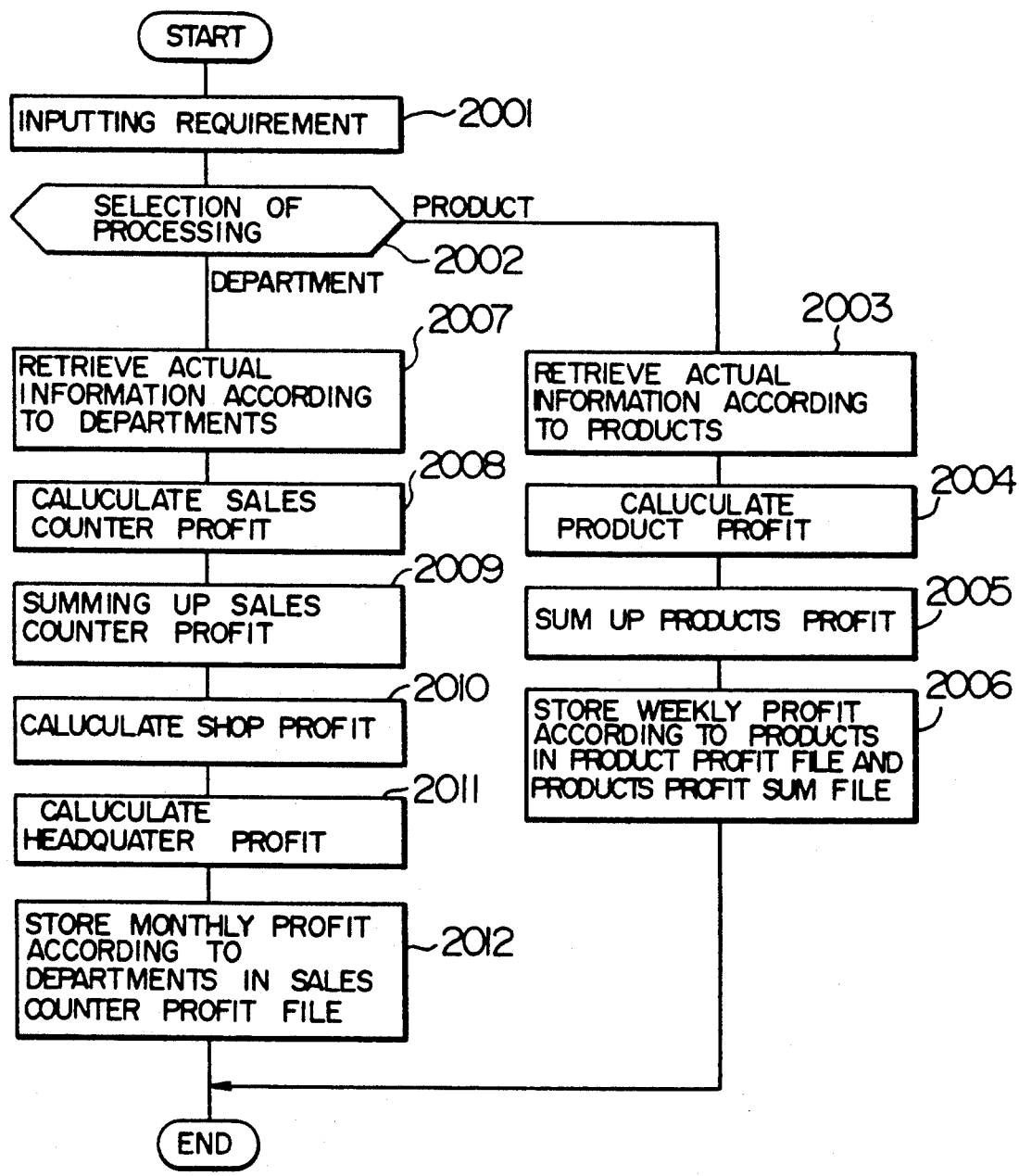
FIG. 5 is a flowchart showing operations associated with FIG. 4.

FIG. 5 is a flowchart showing the operation of the processing groups above. Referring now to the flowchart of FIG. 5, a description will be given of the operation of the embodiment of FIG. 4 with reference to the table configurations of FIGS. 6a to 12.

Step 2001: Input of profit calculation request. Either one of the following two requests is received from the computer terminal device 13.

(1) Calculation of weekly profit according to each product (unit product profit and total products profit)

(2) Calculation of monthly profit according to each organization (headquarter profit, shop profit, sales section profit, total sales section profits)

FIG. 6a shows a display example of a request input screen associated with the requests listed above. On the display screen 131 of the terminal device 13, there is issued an inquiry to select either one of the two requests such as "What kind of requirement?". The system manager then depresses a key "1" or "2" disposed in a numeric key section 1321 of the keyboard of the terminal device 13. Depression of the key "1" indicates a request for the calculation of the weekly profit for each product; whereas depression of the key "2" denotes a request for the calculation of the monthly profit for each organization. In this processing, either one of the inputs of keys "1" and "2" is received and the input result is stored in a calculation request table 41. FIG. 6b shows the structure of the calculation request table 41. The input result is stored in a request kind field 411 of the table 41.

Step 2002: Selection of calculate processing. One of the following two types of calculate processing is selected for execution thereof.

(1) Profit calculation according to each product (2) Profit calculation according to each organization Here, a data value is fetched from the request kind field 411 of the calculation request table 41. If the value is "1", control is passed to processing of step 2003; whereas if the data value is "2", the processing proceeds to step 2007.

Step 2003: Retrieval of actual information according to products. The system retrieves such twelve kinds of actual information items from the main data base 5 including (i) sales year, (ii) sales month, (iii) sales week (indicating a sequential week number of the sales month), (iv) product name, (v) shop name, (vi) sales section name, (vii) sales amount of the product in the week, (viii) purchase price, (ix) transportation expense, (x) warehouse expense, (xi) processing expense, and (xii) order issuance and acceptance expense. For any items for which the value above are not calculated in advance, the values are calculated by use of the actual information of the main data base 5 according to the expense calculate algorithms stored in the algorithm base 30.

FIG. 7 shows the configuration of the products profit table 46. The twelve types of actual information items above are stored in the associated fields of the table 46, namely, in the fields 4601 to 4606, and 4608 to 4613, respectively.

Step 2004: Calculation of profit. The products profit for each product is calculated for each sales section of each shop by use of the expression (2).

First, the system reads the data from the first row of the products profit table 46, namely, from the sales amount field 4608, the purchase price field 4609, the transportation expense field 4610, the warehouse expense field 4611, the processing expense field 4612, and the order issuance and acceptance expense field 4613. Based on the obtained data, the products profit is computed according to the expression (2) and is then stored in the first row associated with the products profit field 4607. The operation above is repeatedly conducted for all rows of the products profit table 46.

Step 2005: Calculation of total products profit. The total products profit is calculated by use of the expression 6.

First, a product name is read from the first row assigned to the product name field 4604 of the products profit table 46. Next, a product name is similarly read from the second row. If these product names match with each other, the data of the first row of the product profit field 4607 is added to data of the second row thereof to attain the sum of these data items. This operation is conducted also for the data of the fields 4608 to 4613, respectively. The operations above are repeatedly carried out for all rows in a sequential fashion, namely, for the third row, fourth row, etc. The obtained results are then loaded in the respective fields of the first row of the products profit table 47.

FIG. 8 shows a configuration of the products profit sum table 47 including a year field 4701, a month field 4702, a week field 4703, and a product name field 4704, which are respectively loaded with data stored in the year field 4601, the month field 4602, the week field 4603, and the product name field 4604 of the first row of the products profit table 46. The table 47 further includes a products profit field 4705, a total sales amount field 4706, a total purchase price amount field 4707, a total transportation expense field 4708, a total warehouse expense field 4709, a total processing expense field 4710, and total order issuance and acceptance expense field 4711, which are respectively loaded with the total values thus attained above.

The operations described above are executed for all products.

Step 2006: Storing weekly profits according to products. Data of the products profit table 46 are stored in a product profit file 65 in a format applied to the products profit table 46.

In addition, data of the total products profit table 46 is stored in a products profit sum file 66 according to a format used for the products profit sum table 47. Incidentally, the product profit file 65 and the products profit sum file 66 are allocated in the sub-data base 6 as shown in FIG. 4.

The processing of the weekly profit calculation according to products has been a described.

Next, description will be given of the calculate processing of the monthly profit according to organizations.

Step 2007: Retrieval of actual information according to organizations. This step retrieves eight kinds of actual information items from the main data base 5 including (i) sales year, (ii) sales month, (iii) shop name, (iv) sales section name, (v) sales amount of the sales section in the month, (vi) purchase price, (vii) rebate, and (viii) operation cost. If the operation cost has not been calculated yet, the operation cost is calculated from the actual information stored in the main data base 5 by use of the algorithm stored in the algorithm base 30, the algorithm being prepared to calculate the operation cost according to sales sections and shops. FIG. 9 shows the configuration of the sales section profit table 44. The eight kinds of actual information items are stored in the associated fields of the table 44, namely, in the fields 4401 to 4403 and 4405 to 4409, respectively.

Figure 11:
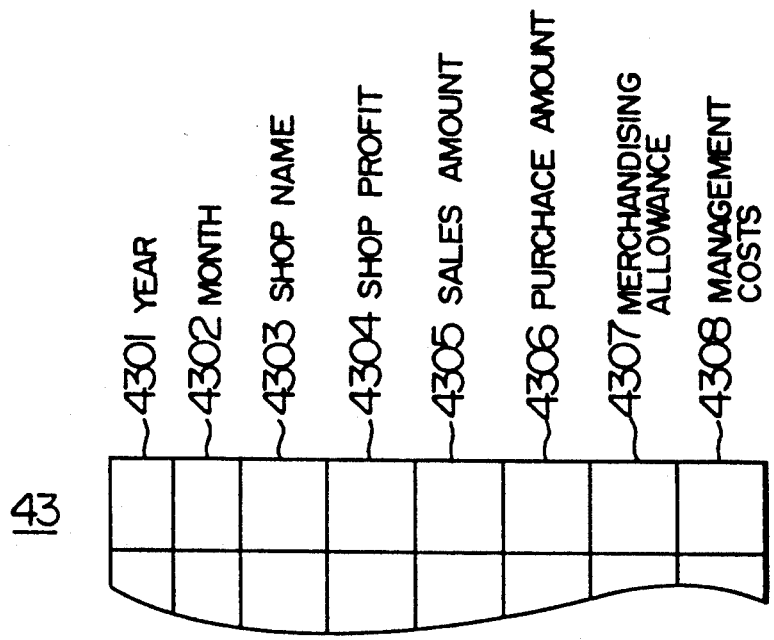

Thereafter, the system retrieves from the main data base 5 seven kinds of actual information items including (i) sales year, (ii) sales month, (iii) shop name, (iv) sales amount of the shop in the month, (v) purchase price, (vi) rebate, and (vii) operation cost. If the operation cost has not been calculated yet, the operation cost is calculated from the actual information stored in the main data base 5 by use of the algorithm stored in the algorithm base 30, the algorithm being prepared to calculate the operation cost according to shops. FIG. 11 shows the configuration of the shop profit table 43. The seven kinds of actual information items are stored in the associated fields of the table 43, namely, in the fields 4301 to 4303 and 4305 to 4308, respectively.

Figure 12:
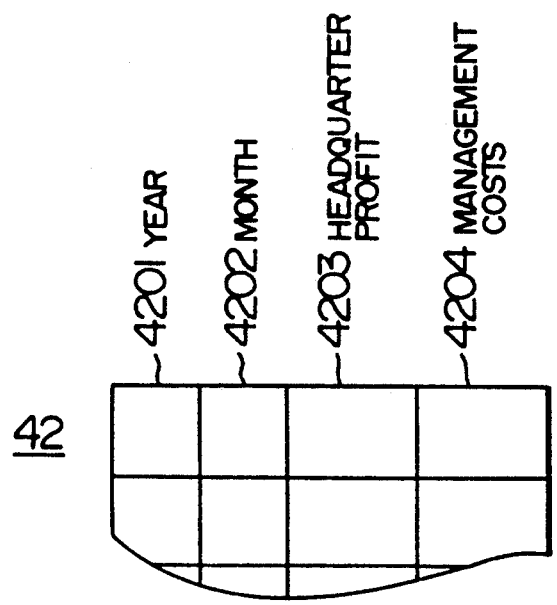

Finally, the system retrieves from the main data base 5 three kinds of actual information items including (i) sales year, (ii) sales month, and (iii) management costs of headquarter in the month. If the management cost has not been calculated yet, the management cost is calculated from the actual information stored in the main data base 5 by use of the algorithm stored in the algorithm base 30, the algorithm being prepared to calculate the management cost of the head-quarter. FIG. 12 shows the configuration of the head-quarter profit table 42. The three kinds of actual information items are stored in the year field 4201, the month field 4202, and operation cost field 4204 of the table 42.

Step 2008: Calculation of sales section profit. According to the expression (3), the profits are computed for each sales section of each shop.

First, the system reads data from the first row of the sales section profit table 44, namely, from the sales amount field 4406, the purchase price field 4407, the allowance field 4408, and the management cost field 4409. By use of the obtained data, the sales section profit is calculated according to the expression (3). The resultant sales section profit is stored in the first row associated with the sales section profit field 4405. These operations are repeatedly conducted for all rows of the sales section profit table 44.

Step 2009: Calculation total of sales section profits. First, the system reads data, namely, a sales section name from the first row associated with the sales section name field 4404 of the sales section profit table 44. Next, a sales section name is similarly read from the second row of the sales section name field 4404. If these two sales section names match with each other, data of the first row of the sales section profit field 4405 is added to data of the second row thereof to attain the sum of the data values. The same operation is conducted also for the data values of the fields 4406 to 4409. These operations are repeatedly conducted for all rows in a sequential fashion, namely, for the third row, the fourth row, etc. The results are stored in the first row of the sales section profit sum table 45.

FIG. 10 shows the configuration of the sales section profit sum table 45 including a year field 4501, a month field 4502, and a sales section name field 4503, which are respectively loaded with data stored in the first row including the year field 4401, the month field 4402, and the sales section name field 4403 of the sales section profit table 44. The table 45 further includes a total sales section sales amount field 4505, a total sales section purchase amount field 4506, a total sales section allowance field 4507, and a total sales section management cost field 4508, which are respectively loaded with the total values described above.

The processing above is conducted for all sales sections.

Step 2010 Calculation of shop profit.

According to the expression 4, the profit is computed for each shop.

First, data is read from the first row of the shop profit table 43, namely, from the sales amount field 4305, the purchase amount field 4306, the allowance field 4307, and the management cost field 4308. By use of the obtained data, the shop profit is calculated according to the expression (4). The resultant shop profit is stored in the first row of the shop profit field 4304. The operations above are also repeatedly carried out for all rows of the shop profit table 43.

Step 2011: Calculation of headquarter.

The profit is calculated for the overall company according to the expression (5).

First, the system calculates the total of the data items stored in the shop profit fields 4304 of the shop profit table 43. Thereafter, the data stored in the management cost field 4204 of the headquarter profit table 42 is subtracted from the total thus obtained, thereby calculating the headquarter profit. The resultant headquarter profit is stored in the headquarter profit field 4203.

Step 2012: Storing of monthly profit according to organization.

Various data items of the sales section profit table 44 are stored in the sales section profit file 62 in a format applied to the sales section profit table 44. Furthermore, the data respectively stored in the sales section profit sum table 45, the shop profit table 43, and the headquarter profit table 42 are loaded in the associated files, that is, the sales section profit file 63, the sales section profit sum file 64, the shop profit file 62, and the headquarter profit file 61. The data are stored in these files in the formats applied to the corresponding tables.

Next, referring to the drawings, an embodiment of a data analysis method will be described in detail with reference to a specific example of the profit analysis above.

Figure 13:
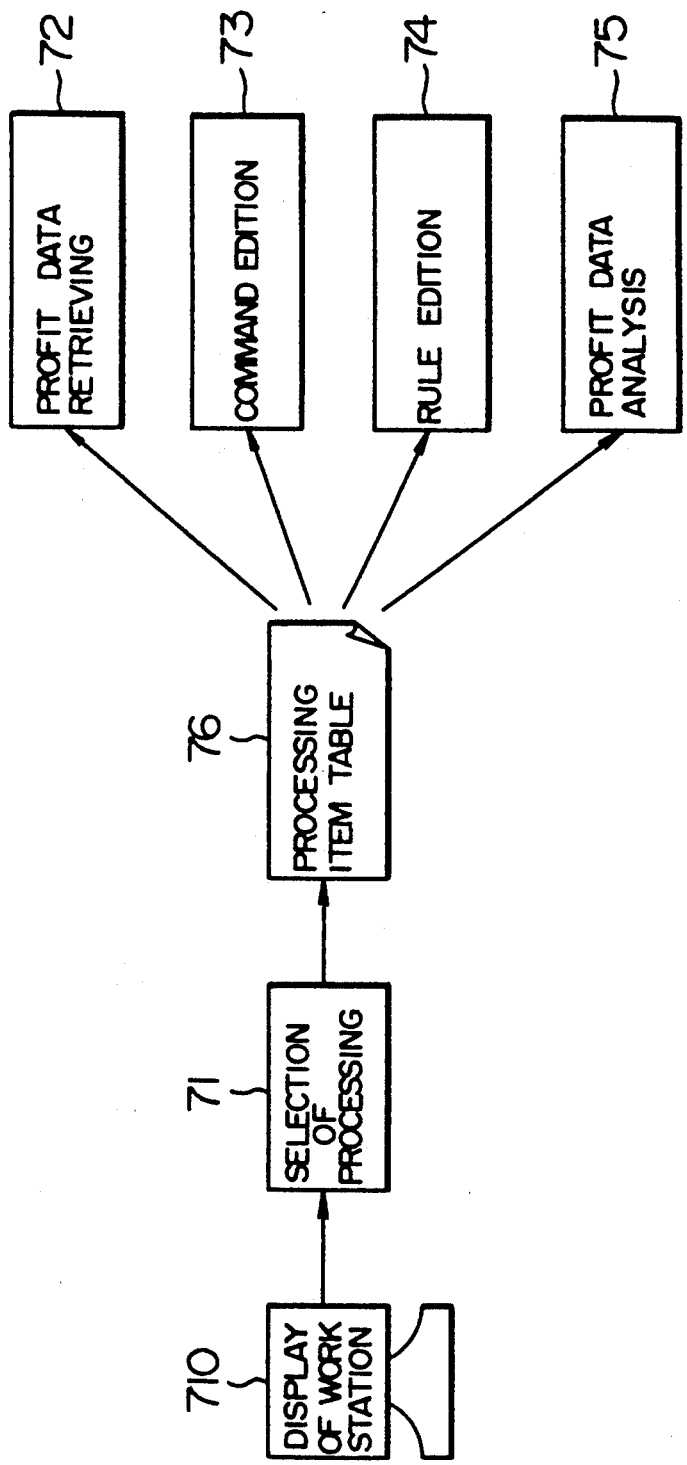
FIG. 13 is a schematic diagram showing the configuration of the data analysis processing in an embodiment according to the present invention.

FIG. 13 shows a functional configuration of this embodiment, which is implemented with the processing as follows.

(1) Profit data retrieval 72: Retrieves profit data from the sub-data base 6 and then stores the data in the private data base 9.

(2) Profit data analysis 75: Analyzes profit data stored in the private data base 9. This analysis may also be executed through an interactive operation with the user.

(3) Command editing 73: The analysis processing 75 outputs graphs and diagrams in fixed patterns by use of commands. This processing 73 edits commands to output the graphs in the predetermined patterns.

(4) Rule editing 74: The analysis processing 74 processes know-how collected from experienced managers to constitute a rule base so as to present an analysis advice to the user by use of the rule base. This processing 74 edits the rules.

(5) Selection of processing 71: Inputs an indication of which one of the processing (1) to (4) above is to be executed.

Figure 14:
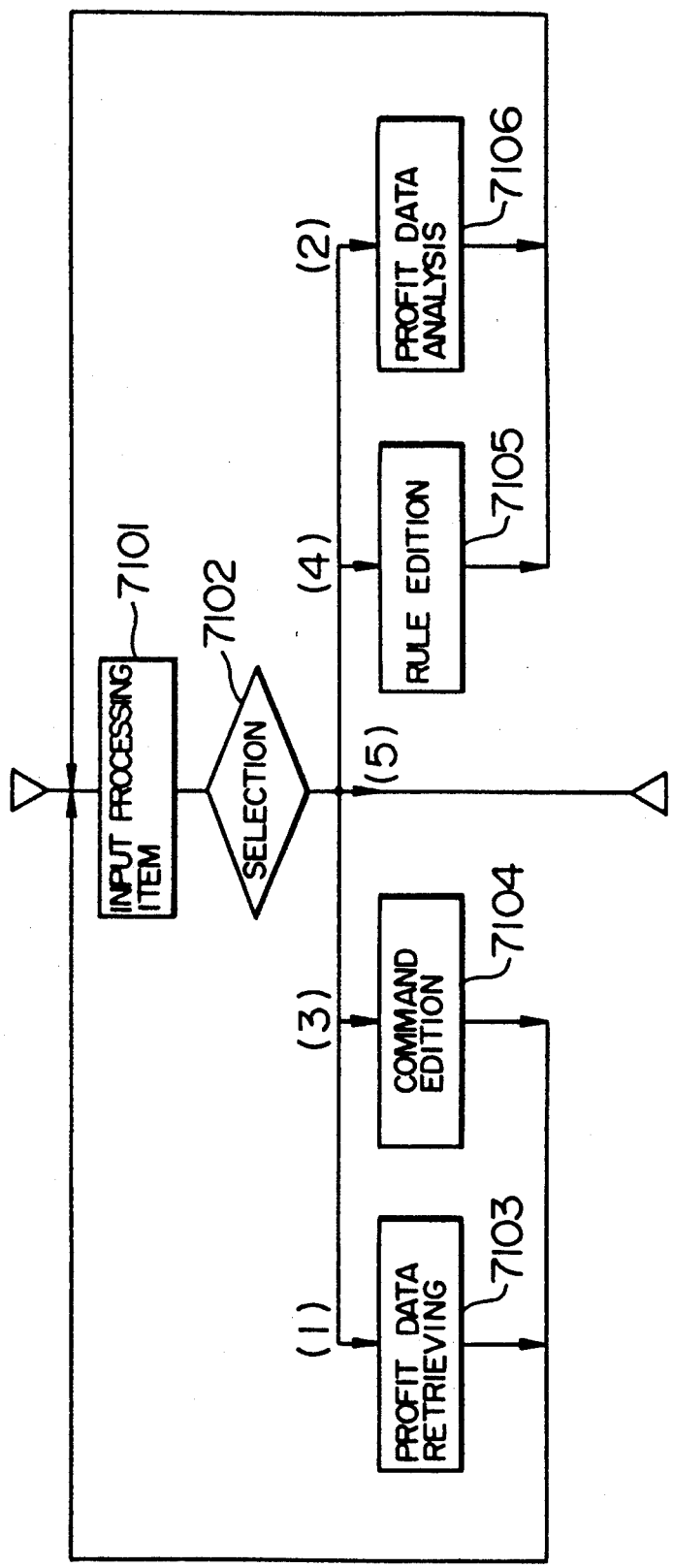
FIG. 14 is a flowchart showing operations associated with FIG. 13.

FIG. 14 shows a flow of operations of the five processing above. A description will now be given of this embodiment.

Step 7101: Input of processing item.

Figure 15A:
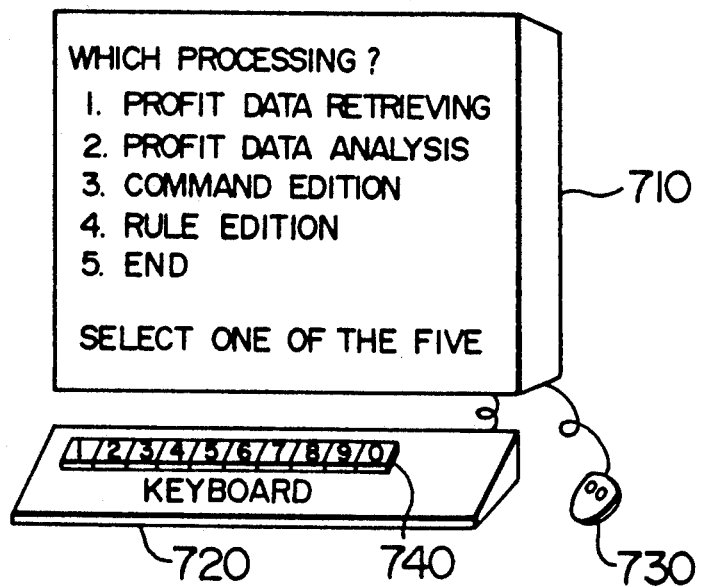
Figure 15B:
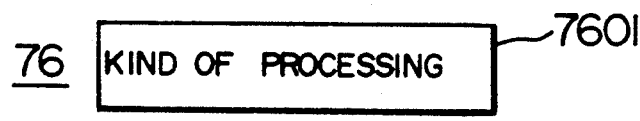

FIG. 15a shows a display example of processing items on the input screen. There is issued an inquiry on the display screen 710 of the work station 7 so as to determine a processing item to be selected. In response to this request, the user selects either one of the keys "1" to "5" on the numeric key unit 740 of the keyboard 720. The indication of a key depression is then accepted and the input result is stored in the processing item table 76. FIG. 15b shows the constitution of the processing item table 76 in which the input result is loaded in a processing item number field 7601.

Step 7102: Selection of processing.

Either one of the processing (1) to (4) is selected for execution. Specifically, the system reads data from the processing item number field 7601 of the processing item table 76. If the data is "1", "2", "3", "4", or "5", control is passed to the step 7103, 7106, 7104, 7105, or the processing end, respectively.

Step 7103: Retrieval of profit data.

The profit data retrieval 72 is executed and then control is transferred to the step 7101.

Step 7104: Editing of commands.

The command editing 73 is conducted and then control is returned to the step 7101.

Step 7105: Editing of rules.

The rule editing 74 is effected and then control is passed to the step 7101.

Step 7106: Analysis of profit data.

The profit data analysis 75 is executed and then control is transferred to the step 7101.

Next, description will be given in details of the profit data retrieval 72, the command editing 73, the rule editing 74, and the profit data analysis 75.

(1) Profit data retrieval 72

Figure 16:
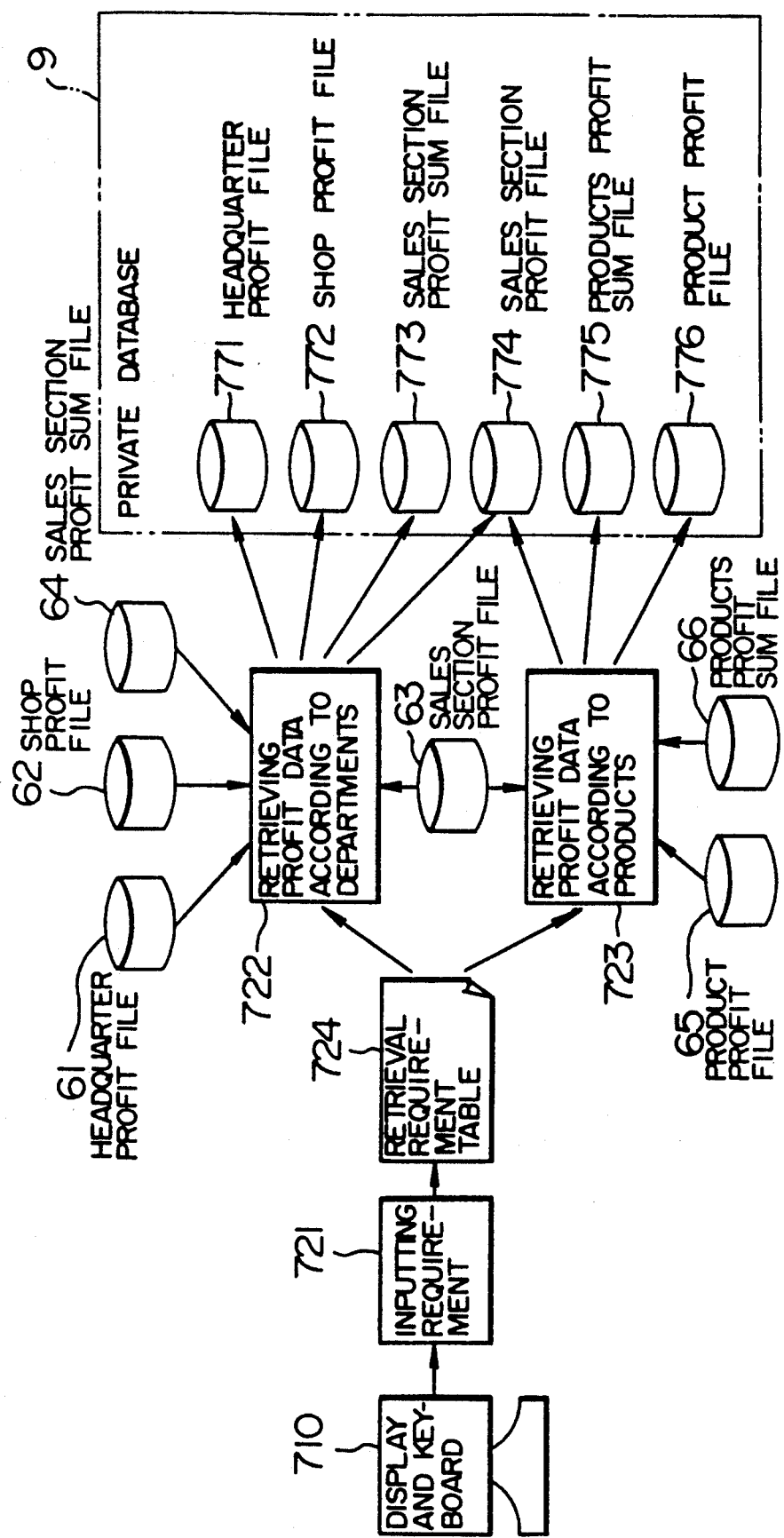
FIG. 16 is a functional configuration diagram showing the profit retrieval processing in the embodiment according to the present invention.

FIG. 16 shows the functional configuration of the retrieval processing 72, which carries out two kinds of retrieval operations:

(a) Retrieval of monthly profit data according to organizations or departments; and, (b) Retrieval of weekly profit data according to products.

The organization profit data retrieval 722 achieves the retrieval (a) above, whereas the products profit data retrieval 723 effects the retrieval (b). The retrieval request acceptance 721 issues an inquiry to the user by means of the display screen 710 of the work station 7 such that the user selects either one of the retrieval operations (a) and (b).

Figure 17:
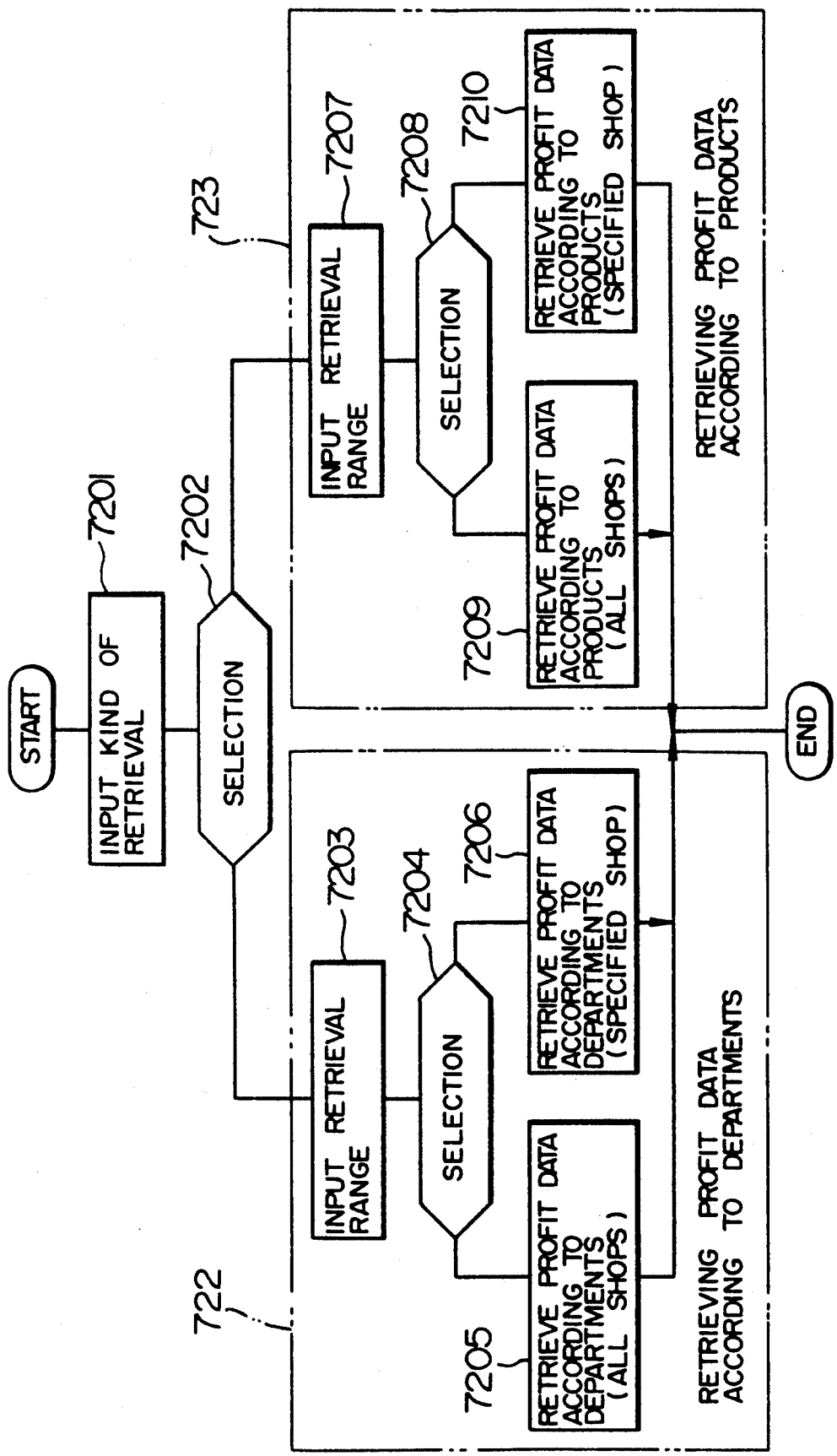
FIG. 17 is a flowchart showing operations in the configuration of FIG. 16.

FIG. 17 is a flowchart showing operations of the processing 72. Description will be given of the operations of the profit data retrieval 72 with reference to FIG. 17.

Step 7201: Input of kind of retrieval.

FIG. 18a shows a display example for inputting a type of retrieval on the input screen. On the display screen 710 of the work station 7, there is issued an inquiry of "What kind of retrieval?". The user then depresses either one of the keys "1" and "2" in the numeric key unit 740 of the keyboard 720. Indication of the key depression is received and the input result is stored in the retrieval request table 724. FIG. 18d shows the configuration of the retrieval request table 724. The input result is stored in the retrieval kind field 7241 of the table 724.

Step 7202: Selection of kind of retrieval.

The system reads data from the retrieval kind field 7241 of the table 724. If the data is "1" or "2", control is passed to the step 7203 or 7207, respectively.

Step 7203: Input of retrieval range (according to organization)

FIG. 18b shows a display example for inputting a range of retrieval on the input screen. A retrieval period and a retrieval range are inputted in this step. The retrieval period is indicated by a first date including the year, month, and day of the retrieval (retrieval start date) and a last date including the year, month, and day of the retrieval (retrieval end date). The retrieval range limits the retrieval operation zone, for example, a retrieval for all shops, a retrieval for the monthly profit according to shops, or a retrieval for a particular shop, namely, a retrieval for the monthly profit information according to sales counters and shops. In the case of the retrieval for a particular or specified shop, a shop name thereof is to be inputted. The pertinent input results are stored in the retrieval range field 7242, the shop name field 7243, the retrieval start date field 7245, and the retrieval end date field 7246, respectively.

Step 7204: Selection of retrieval processing (according to organization)

The system reads data from the retrieval range field 7242 of the table 724. If the data is "1" or "2", control is passed to processing of the step 7205 or 7206.

Step 7205: Retrieval of organization profit data (all shops)

The system reads data from the retrieval start date field 7245 and the retrieval end date field 7246 of the table 724. Profit data in the range of the period are transferred from the headquarter profit file 61 to the work station headquarter profit file 771 according to the same format.

In addition, the relevant data is further transferred from the shop profit file 62 to the work station shop profit file 772 in the same format. Moreover, the associated data is transferred from the sales section profit sum file 64 to the work station sales section profit sum file 773 in the same format, thereby completing the processing.

Step 7206: Retrieval of organization profit data (specified shop)

The system reads data from the retrieval start date field 7245, the retrieval end date field 7246, and the shop name field 7243 of the table 724.

Profit data in the range of period for the specified shop are transferred from the shop profit file 62 to the work station shop profit file 772 according to the same format. In addition, the relevant data is further transferred from the sales section profit file 63 to the work station sales section profit file 774 in the same format, thereby completing the processing.

Step 7207: Inputting retrieval range (according to products)

FIG. 18c shows a display example of a retrieval range input screen in which a retrieval period and a retrieval range are inputted. The retrieval period is indicated by a first date of the retrieval (retrieval start date) and a last date of the retrieval (retrieval end date). The retrieval range is specified by a name of the objective sales section and a limitation of, for example, a retrieval for all shops, namely, a retrieval for total product profit information or a retrieval for a particular or specified shop, namely, a retrieval for the product profit information according to sales sections and shops. In the case of the retrieval for a particular shop, a shop name thereof is to be inputted. The pertinent input results are stored in the retrieval range field 7242, the shop name field 7243, the sales section name field 7244, the retrieval start date field 7245, and the retrieval end date field 7246, respectively of the table 724.

Step 7208: Selection of retrieval processing (according to products).

The system reads data from the retrieval range field 7242 of the table 724. If the data is "1" or "2", control is passed to processing of the step 7209 or 7210.

Step 7209: Retrieval of products profit data (all shops).

The system reads data from the retrieval start date field 7245, the retrieval end date field 7246, and the sales section name field 7244 of the table 724. Profit data of the pertinent sales section in the range of period are transferred from the sales section profit file 63 to the work station sales section profit file 774 according to the same format. In addition, the relevant data is further transferred from the products profit sum file 66 to the work station products profit sum file 775 in the same format, thereby completing the processing.

Step 7210: Retrieval of products profit data (specified shop).

The system reads data from the retrieval start date field 7245, the retrieval end date field 7246, the sales section name field 7244, and the shop name field 7243 of the table 724. Thereafter, profit data of the pertinent sales section of the specified shop in the range of period for the specified shop are transferred from the sales section profit file 63 to the work station sales section profit file 774 according to the same format. In addition, the relevant data is further transferred from the product profit file 65 to the work station product profit file 776 in the same format, thereby completing the processing.

(2) Command editing 73

FIG. 19a shows a functional configuration of the processing of command editing 73, which is implemented by use of an existing screen editor.

FIG. 19b shows the configuration of the command file 777 in which a command comprises a command name, a graph or chart type, and constituent elements to generate the chart (more concretely, an abscissa name, an ordinate name, and a legend or an example). In the diagram, "AAA", "LINE GRAPH", "BBB", "CCC", "DDD", and "EEE" designate the respective data names.

(3) Rule editing 74

FIG. 20a shows a functional configuration of the processing of rule editing 74, which is implemented by use of an existing screen editor.

FIG. 20b shows the configuration of the rule file 778 in which a rule is represented by a format of IF/THEN. The IF part includes a command name and a feature or characteristic of a chart or graph displayed by the command, whereas the THEN part comprises an analysis advice.

(4) Profit data analysis 75

This processing 75 is provided with a function to display a chart for an analysis through an interactive operation. The display request is supplied as follows.

(i) Indication of a chart type and constituent elements through an interactive operation (input of analysis requirements).

(ii) Indication by use of a command (command input).

In addition, the profit data analysis processing 75 supports a function implemented by use of a knowledge engineering technology to present an analysis advice to the user.

FIG. 21 shows a functional configuration of the processing 75, which comprises the following seven elements.

(a) Analysis type input 751

This processing is used to input "analysis advice presentation?", "analysis chart display?", or "request method for chart display?"

(b) Analysis requirement input 752

This processing is disposed to input analysis requirements associated with the request method of (i) above.

(c) Command input 753

This processing is employed to input an analysis request according to the request method of (i) above.

(d) Command interpretation 754

This processing is utilized to analyze requests inputted in the processing (b) and (c) above.

(e) Retrieval of profit data 755

This processing is disposed to retrieve profit data from the private data base 9 depending on the analyzed requests.

(f) Display of analysis graph 756

This processing is used to present the retrieval data in the requested chart format to the user.

(g) Presentation of analysis advice 757

This processing presents an analysis advice to the user based on the knowledge engineering technology.

Figure 22:
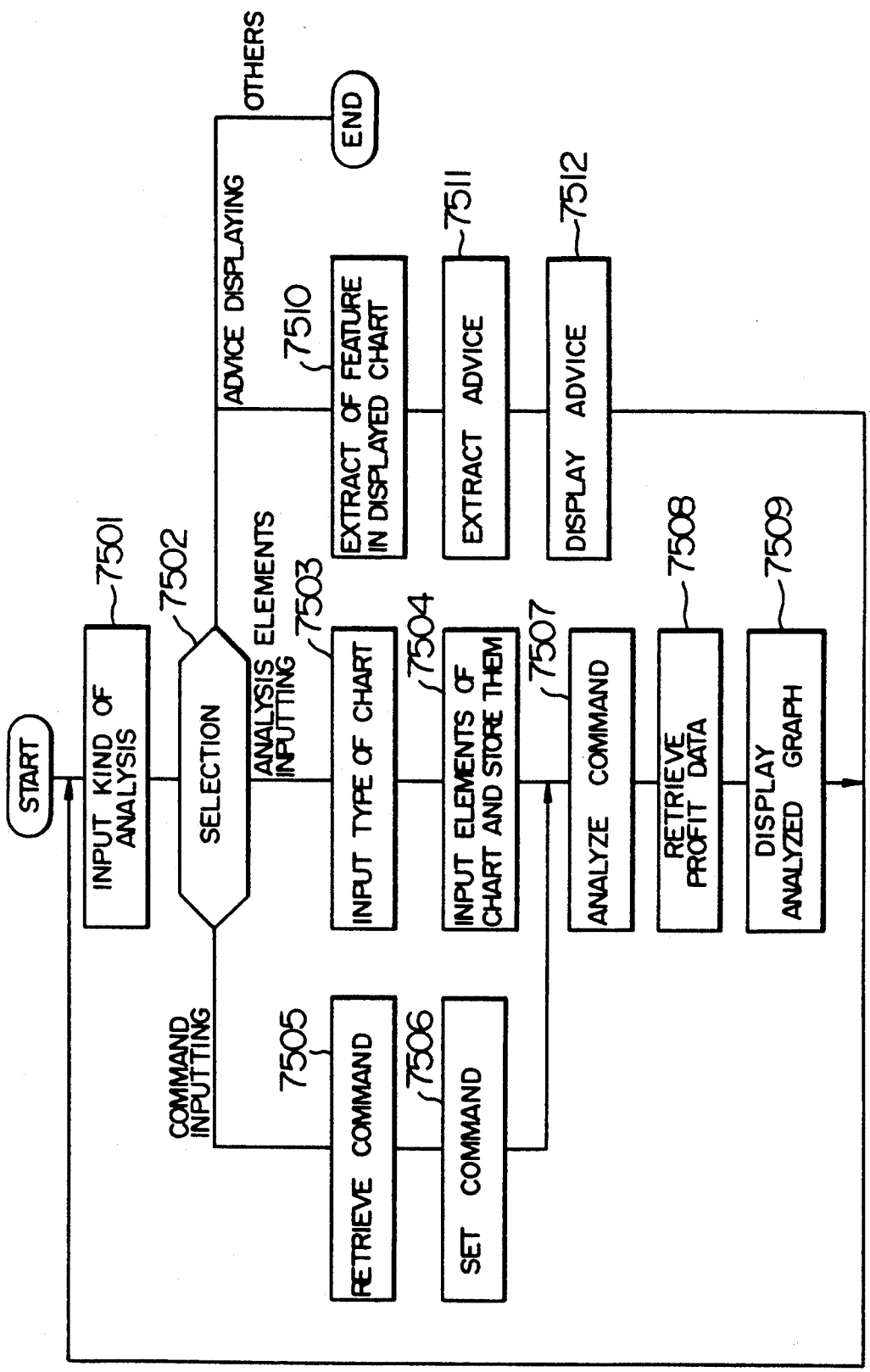
FIG. 22 is a flowchart showing operations of the configuration of FIG. 21.

FIG. 22 shows an operation flow of the processing 75. Description will now be given of this operation by use of the flowchart of FIG. 22.

Step 7501: Analysis kind input

Figure 23:
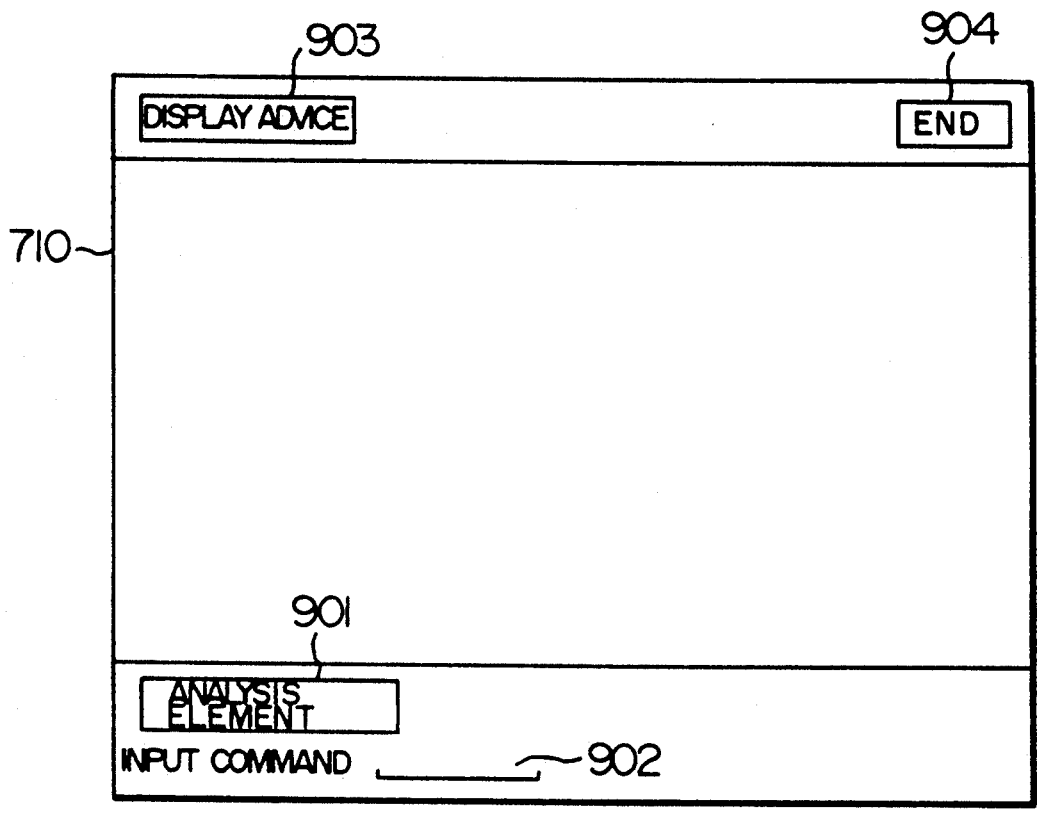
Figure 24:
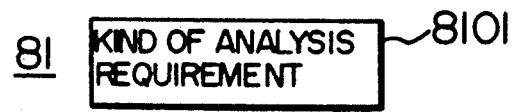

FIG. 23 shows a display example of the analysis kind input screen in which the operator inputs either one of the items including "analysis element or requirement input" 901, "command input" 902, "advice display" 903, and "end" 904. In this operation, the user picks the desired item by use of a mouse connected to the work station 7. The request for the "command input" 902 is conducted by means of the keyboard 720. The input result is then stored in the analysis requirement table 81. FIG. 24 shows the constitution of the analysis requirement table 81. The input result is stored in an analysis requirement kind field 8101 of the table 81.

Step 7502: Analysis requirement selection

The system obtains data from the analysis requirement kind field 8101 of the table 81. If "analysis requirement input", "command input", or "advice display" is indicated by the obtained data, control is passed to a step 7503, 7505, or 7510, respectively. If the data indicates "others", control is transferred to an end step.

Step 7503: Input type of chart

Figure 25:
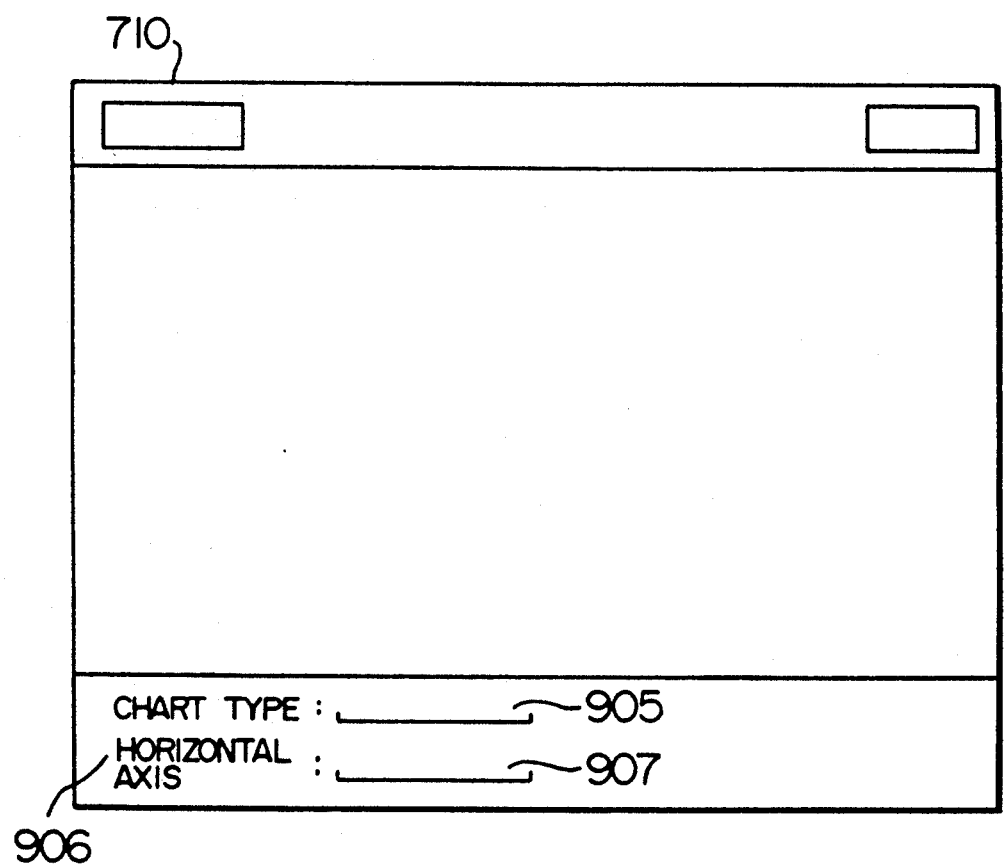

FIG. 25 shows a display example of the screen in which a chart type and chart constituent elements are to be inputted. The user keys in a chart type by use of the chart type field 905 from the keyboard 720. This processing step 7503 receives the inputted chart type.

Step 7504: Input element of chart constituent

Figure 26:
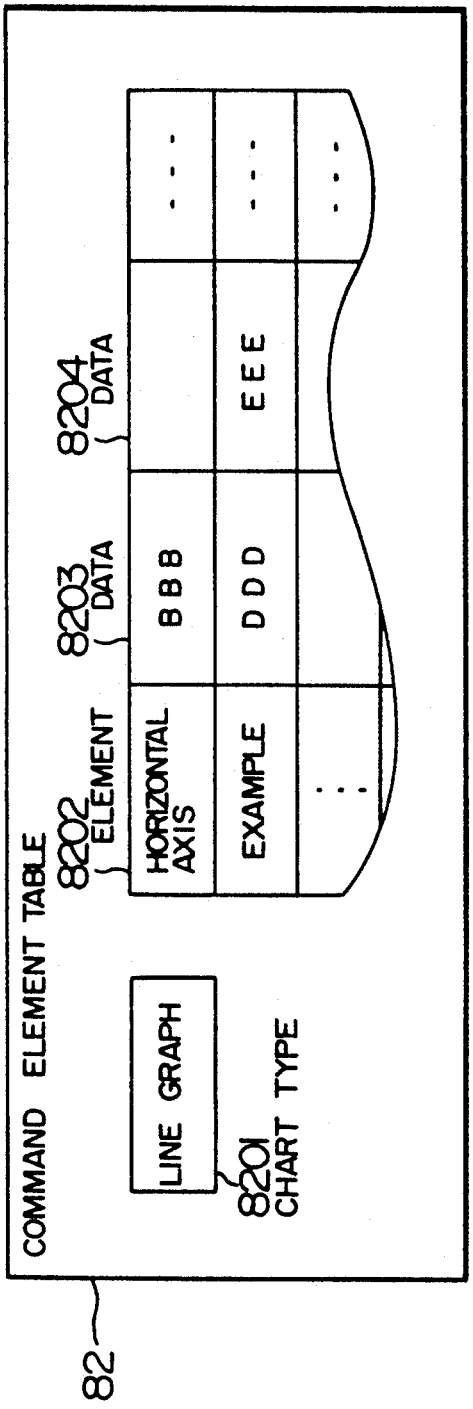

Elements of chart constituent related to the chart type are inputted. A constituent element name is displayed in the field 906 such that the user inputs data associated with the displayed constituent element name. This step receives the inputted data. The processing above is repeatedly conducted for all constituent elements so as to store the input results in the command element table 82. FIG. 26 shows the configuration of the command element table 82. The chart type, constituent element name, and data thus inputted are stored in the chart type field 8201, element name field 8202, and data field 8203 and 8204, respectively. Thereafter, control is passed to a step 7507.

Step 7505: Retrieval of command

A command associated with the inputted command name is retrieved from the command file 777.

Step 7506: Command setting

A chart type and constituent elements of the retrieved command are stored in the command element table 82.

Step 7507: Command interpretation

Figure 27:
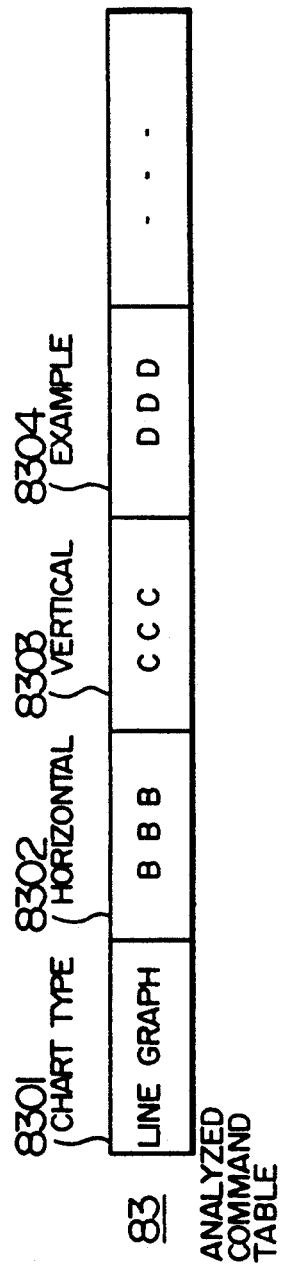

The data loaded in the command element table 82 is interpreted so as to be stored in the analyzed command table 83. FIG. 27 shows the constitution of the table 83. Data of the chart type filed 8201 of the table 82 is moved to the chart type field 8301 of the table 83. The system obtains data items from the element name field 8202 and the data fields 8203 and 8204 of the table 82. If the element name indicates "horizontal-axis name", "vertical-axis name", or "example", the pertinent data is stored in the horizontal-axis name field 8302, vertical-axis name field 8303, or example field 8304, respectively.

Step 7508: Retrieval of profit information

This step obtains the data name from the horizontal-axis name field 8302 and the example field 8304 of the table 83. By use of the data of the example field 8304 as a retrieval condition, data associated with the data name of the horizontal-axis name field 8302 is retrieved from the private data base 9. The data name and data thus attained are stored in the profit data table 84. FIG. 28 shows the configuration of the profit data table 84. The data name and data are respectively stored in the data name field 8401 and the data 1 field 8402 of the table 84.

For the vertical axis, the similar processing is achieved to store the data name and data in the table name field 8401 and the data 2 field 8402, respectively of the table 84.

Step 7509: Analysis graph display

This step reads the data name and data from the profit data table 84 so as to display on the display screen 710 a graph associated with the chart type indicated by the chart type field 8201 of the table 82. FIG. 29 shows a display example of the analysis graph. The analysis graph is displayed in the analysis graph present area 908, and then control is passed to the step 7501.

Step 7510: Extraction of feature of displayed chart

This step reads data from the profit data table 84 to extract the feature of the profit data.

Step 7511: Advice extraction

This step extracts from the rule base 778 a rule of which the IF part includes the feature associated with the extracted feature. The THEN part of the rule is employed as the advice.

Step 7512: Advice display

Figure 30:
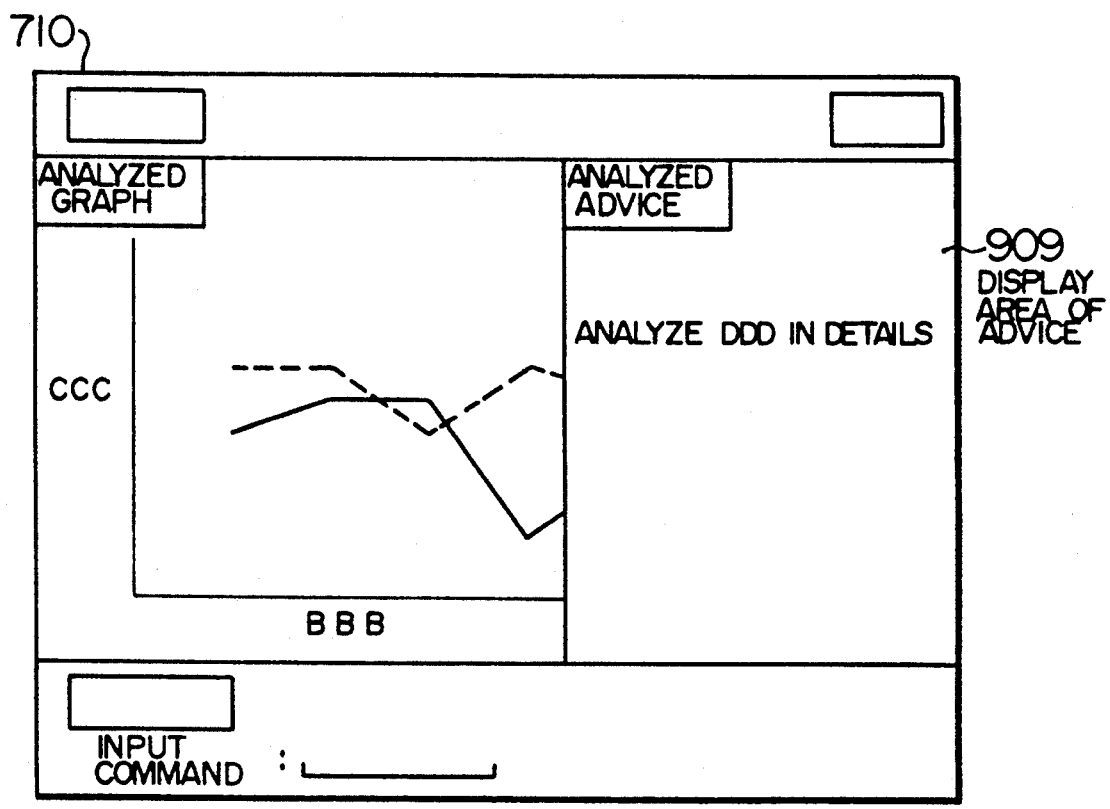

The extracted advice is displayed on the display screen 710. FIG. 30 shows a display example of the advice. The advice is displayed in the advice present area 909 of the display screen 710, and then control is transferred to the step 7501.

According to the present invention, there are attained the following effects.

(1) Since the expense distribution model can be modified by the user, the system can cope with the individuality of each shop as well as of each product and with the growth of the shop automation system.

(2) The profit information items are accumulated according to the utilization purposes of the user; as a consequence, management of the profit information is facilitated; furthermore, there is provided a response capability depending on the utilization purposes.

(3) This system includes a high man-machine feature and there is presented an analysis advice to the user, and hence the analysis job and the system operation can be accomplished according to the skill level of the analyzer.

As a result, according to the present invention, there can be achieved at least the following objects. Creation of a profit management system. Appropriate recognition of products of good and bad sellers and optimization of purchase of products. Creation of information basis to produce management strategy.

As described above, according to the present invention, there can be developed a data management system and a data management method in the system capable of coping with the various data utilization purposes at a high speed.

Particularly, the present invention is effectively applicable to a system in which it is necessary to obtain from a great volume of various kinds of data items analysis results associated with utilization purposes.

When the present invention is applied to a data management system in a shop, for each management unit of the profit management such as the shop or sales section, it is possible to analyze data associated with a purpose of the pertinent management unit.

While particular embodiments of the invention have been shown and described, it will be obvious to those skilled in the art that various changes and modifications may be made without departing from the spirit of the present invention in its broader aspects.

We claim:

1. A method of operating a host computer and at least one operatively associated user work station computer to arrange and distribute actual sales information data comprising accumulated new sales data, the method comprising the steps of:

storing actual sales information data of each sales section of a store in a sales information data base of the host computer;

arranging, within the host computer and at predetermined intervals of time, the actual sales information data stored in the sales information data base into a plurality of organized sales data sets according to requirements of a plurality of uses including profit data relating to respective profit management users on levels of headquarters, shops, sales sections and products;

storing the plurality of organized sales data sets in an organized sales information data base of the host computer;

selectively retrieving, from the organized sales information data base, a first organized sales data set associated with a first use;

storing the retrieved first organized sales data set in a third data base of the at least one user work station computer; and, selectively recovering, with the at least one user work station computer, a portion of the first organized sales data set stored in the third data base to present the portion to an operator for inspection.

2. A data management system comprising:
a first data base;
a second data base;
a first computer connected to said first data base and to said second data base, said first computer including:
i) means for arranging actual sales information data comprising accumulated new sales data stored in said first data base into a plurality of organized sales data sets for use by an associated plurality of user work station processors, the organized sales data sets comprising actual information data items logically related according to a plurality of uses including profit data relating to respective profit management users on levels of headquarters, shops, sales sections and products, and
ii) means for storing said plurality of organized sales data sets into said second data base;
a third data base; and
at least one second computer, as a one of the plurality of user work station processors, connected to said third data base and to said first computer, said second computer including means for retrieving said plurality of organized sales data sets from said second data base,
ii) means for storing the retrieved plurality of organized sales data sets into said third data base, and
iii) means for retrieving the arranged data stored in said third data base for analysis by an operator of said data management system according to a preselected one of said plurality of uses.

3. A sales and profits data management system comprising:

a fundamental data base in a host computer for storing actual data comprising accumulated raw sales data;

data arranging means in the host computer for selectively arranging, at predetermined intervals of time, the actual data stored in the fundamental data base into organized sales data sets according to desired end uses of a plurality of system users, the organized sales data sets including data sets relating to profit data, grouped for respective profit management users on levels of headquarters, shops, sales sections and products and arranged in sets of at least a store data set, a sales section data set, and a product data set;

first data base means in the host computer for storing said organized sales data sets;

a plurality of private data base means each disposed in operative association with a work station for use by said plurality of system users;

data retrieve means in each of the work stations for selectively retrieving a first one of said organized sales data sets from said first data base means according to a request by a one of the plurality of system users;

data store means in each of the work stations for storing the retrieved first one of said organized sales data sets in a one of the plurality of private data base means; and, data manipulate means in each of the work stations for manipulating the data stored in the plurality of private data base means for analysis by said plurality of system users.

4. The data management system according to claim 3 wherein said data arranging means further comprises:

means for converting a sales section set of said actual data into profit data associated with a desired end use of a one of the plurality of system users; and, means for storing the profit data in said first data base means; and, said data retrieve means further comprises:

means for retrieving the profit data from said first data base means in response to a request form the one of the plurality of system users; and, means for storing the retrieved data in said one of the plurality of private data base means.

5. The data management system according to claim 4 wherein:

said first data base means further comprises means for storing first profit data of the sales section set such that the profit data is divided into a shop unit, a sales section unit, a product unit, a unit for a sales section of a shop, and a unit for a product of a section of a shop.

6. A profit and sales data management method for use with a system having a host computer with a first data base for storing first data, and a second data base for storing second data, and a work station with a third data base, for storing third data, the method comprising the steps of:

arranging, by the host computer, the first data stored in the first data base into organized data conveniently arranged according to a desired end use requirement of a user of the system, the desired end use being at least one of a store profit management purpose, a sales section profit management purpose, and a product profit management purpose according to a pertinent hierarchical management unit to which the user belongs;

storing, by the host computer, the organized data as the second data in the second data base of the hose computer;

selectively retrieving, by the host computer, a first utilization data set associated with the desired end use of the user from the second data stored in the second data base;

storing, by the work station, the retrieved first data set as the third data in the third data base of the work station; and, selectively retrieving and displaying, by the work station, portions of the third data stored in the third data base for analysis by the user.

7. The profit and sales data management method according to claim 6 further comprising the steps of:

storing advice knowledge sets related to a data analysis of said third data in a fourth data base of said host computer, each of the advice knowledge sets having input conditions for activation of the set and an output advice portion;

selectively retrieving the advice knowledge set stored in the fourth data base according to a request signal from a user when the request signal matches the input conditions for the retrieved knowledge set; and, outputting to a user the advice portion associated with the retrieved advice knowledge set.

8. The data analysis method according to claim 6 further comprising:

storing profit advice knowledge sets related to a profit data analysis, in the fourth data base, each of the profit advice knowledge sets having an output profit advice portion; and, outputting on said work station a profit advice portion associated with the profit data analysis to the user.

9. The data management method according to claim 6 further comprising the steps of:

conducting a computation on the retrieved portion of the third data to obtain a computation result; and, graphically displaying the computed result.

10. A profit and sales data management system comprising:

a first data base and a second data base;

a first computer means, connected to said first data base and to said second data base for converting actual sales data stored in said first data base into organized sales data sets grouped according to a plurality of uses including use for shop profits analysis, use for sales section profits analysis and use for product profits analysis, and for storing the converted organized sales data sets in said second data base; and a second computer means, connected to said second data base, for selectively retrieving a first data set according to a desired use of a a user of the system from the organized sales data sets stored in said second data base and for selectively arranging and presenting at least a portion of the retrieved first data set for analysis by the user.

11. The data management system according to claim 10 further comprising a display device means, connected to said second computer means, for displaying a result of a computation performed on the portion of the retrieved first data set.

12. The data management system according to claim 11 further comprising a third data base connected to said second computer means, for storing the retrieved first data set and the result of the computation.

* * * * *

UNITED STATES PATENT AND TRADEMARK OFFICE
CERTIFICATE OF CORRECTION

PATENT NO. : 5,237,498
DATED : August 17, 1993
INVENTOR(S) : Tadashi Tenma, et al.

It is certified that error appears in the above-identified patent and that said Letters Patent is hereby corrected as shown below:

Claim 4, column 24, line 37, delete "form" and substitute therefor --from--.

Claim 6, column 24, line 65, delete "hose" and substitute therefor --host--.

Signed and Sealed this

Twelfth Day of April, 1994

Attest:

BRUCE LEHMAN

*Attesting Officer*     *Commissioner of Patents and Trademarks*